United States Patent [19]

Gunderson et al.

[11] Patent Number: 4,518,972

[45] Date of Patent: May 21, 1985

[54] GRAPHICS PLOTTER TURRET HEAD

[75] Inventors: Charles Gunderson, Bueno Park; Henry W. Hammond, Yorba Linda, both of Calif.

[73] Assignee: Sanders Associates, Inc., Nashua, N.H.

[21] Appl. No.: 633,174

[22] Filed: Jul. 23, 1984

[51] Int. Cl.³ .............................................. G01D 15/16
[52] U.S. Cl. .................................................. 346/139 R
[58] Field of Search ................ 346/139 R, 140 R, 46

[56] References Cited

U.S. PATENT DOCUMENTS 2,743,986 5/1956 Bradner .......................... 346/139 R
4,405,931 9/1983 Fujisawa ......................... 346/139 R Primary Examiner—Thomas H. Tarcza
Assistant Examiner—M. Reinhart
Attorney, Agent, or Firm—Louis Etlinger; Wm. F. Porter, Jr.

[57] ABSTRACT

A turret head for use in a graphics plotter for holding a plurality of liquid ink pens adjacent the point of writing and for selectively changing the pens to be the writing pen. Automatic pen tip capping and uncapping is included. A plurality of spaced radial arms are mounted on a turret driven by a stepping motor between main positions. A pen holder assembly is mounted for vertical movement between raised and lowered positions and carries a pen gripping arm thereon. The pen gripping arm is adapted to move vertically between the radial arms of the turret and beneath them as the turret is rotated. The arms are provided with facing releasable gripping fingers for exchanging pens between arms upon contact.

4 Claims, 51 Drawing Figures

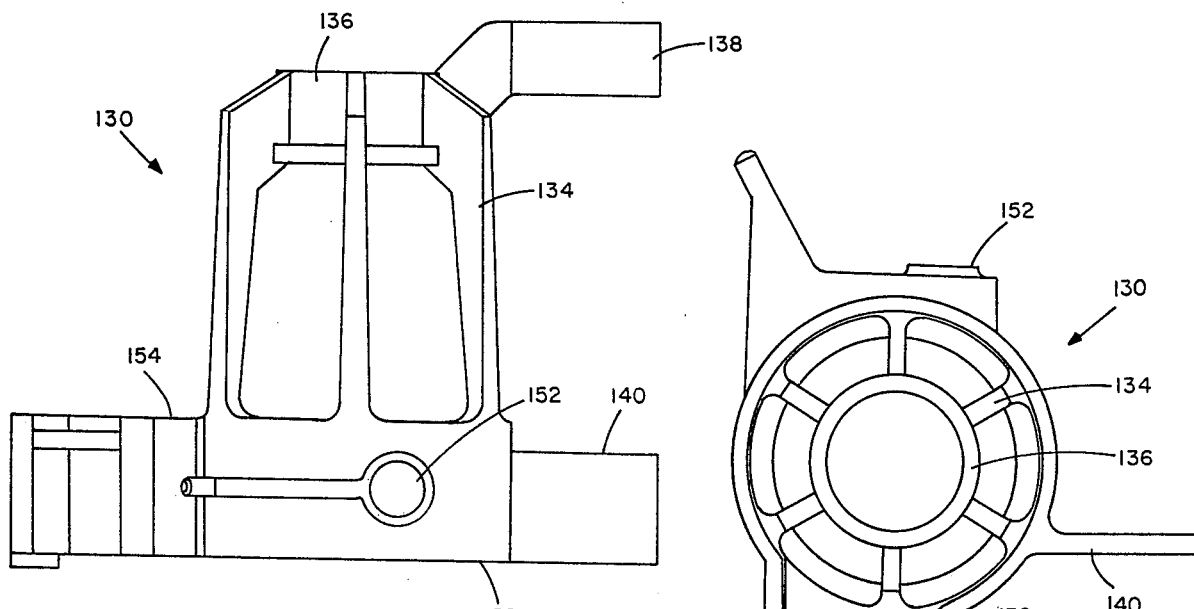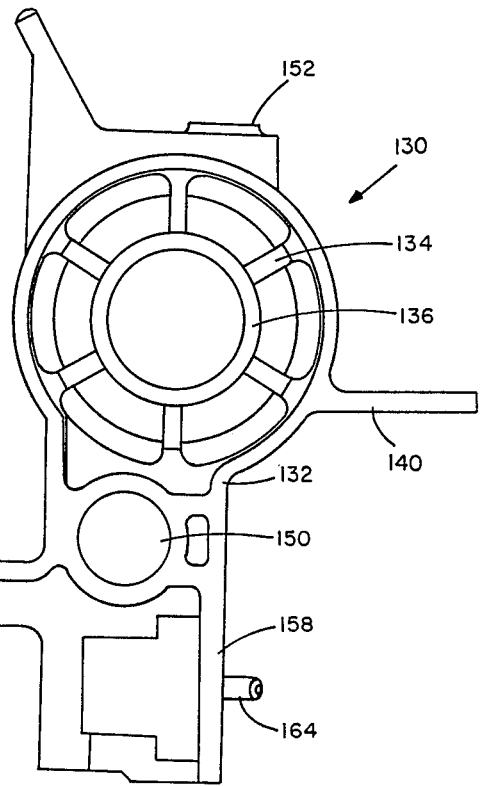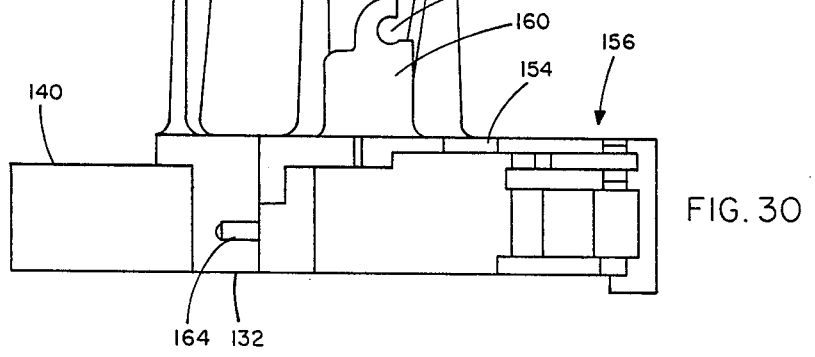
FIG. 28
FIG. 29
FIG. 30
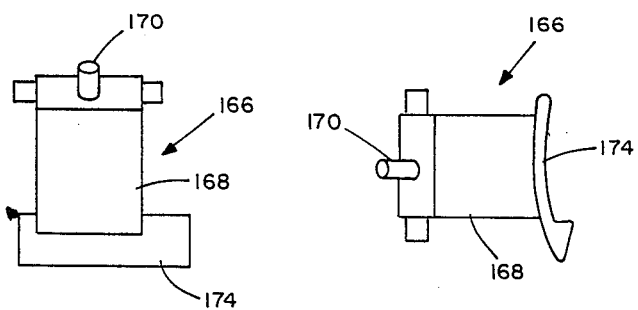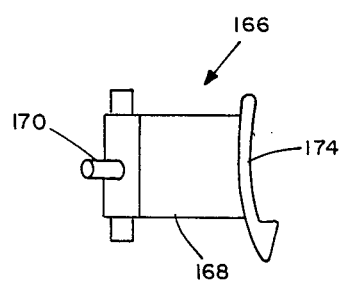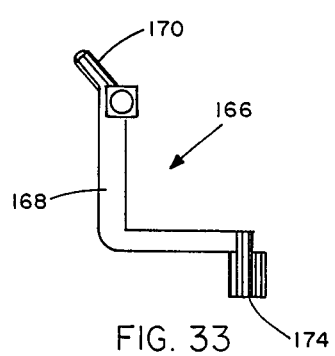
FIG. 31
FIG. 32
FIG. 33

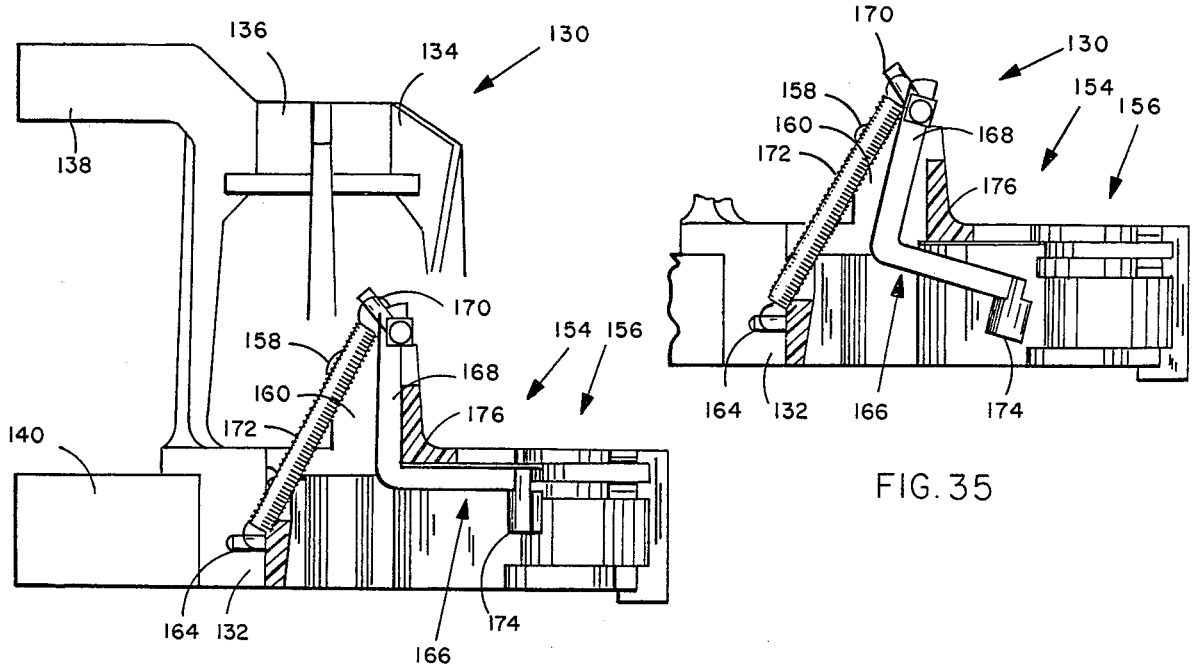
FIG. 34
FIG. 35
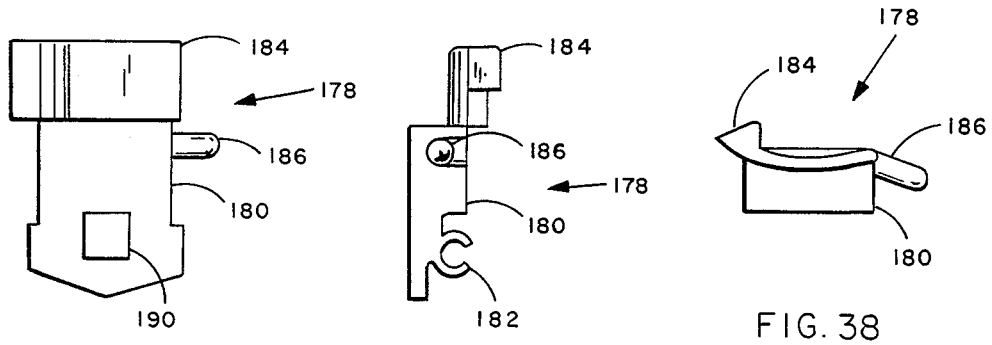
FIG. 36
FIG. 37
FIG. 38
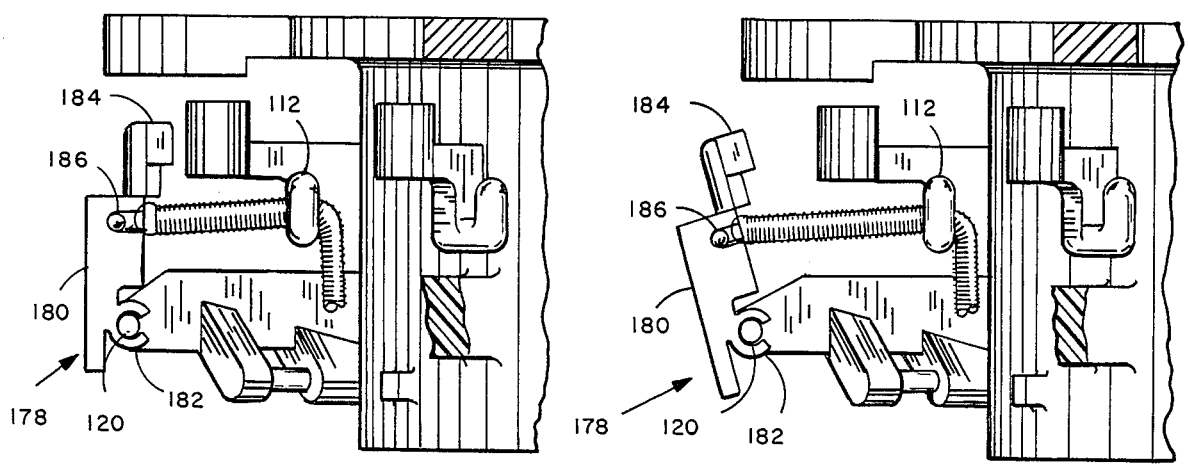
FIG. 39
FIG. 40

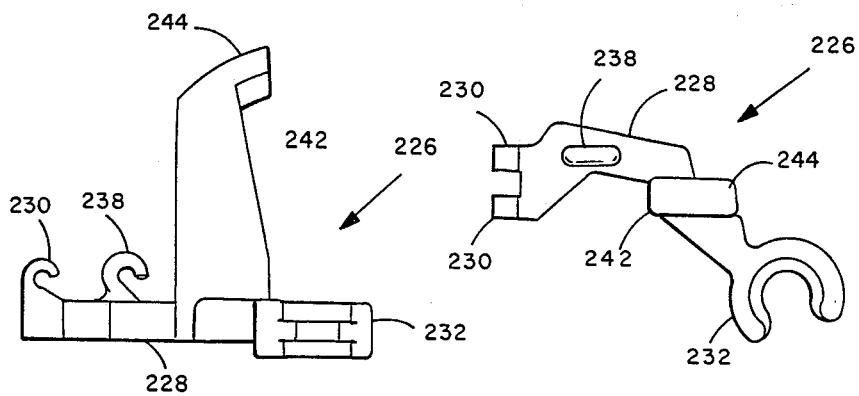
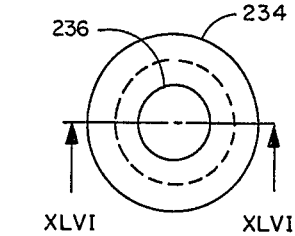
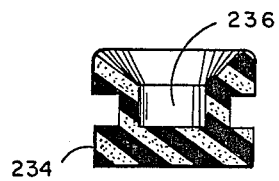
FIG. 43   FIG. 44   FIG. 45   FIG. 46
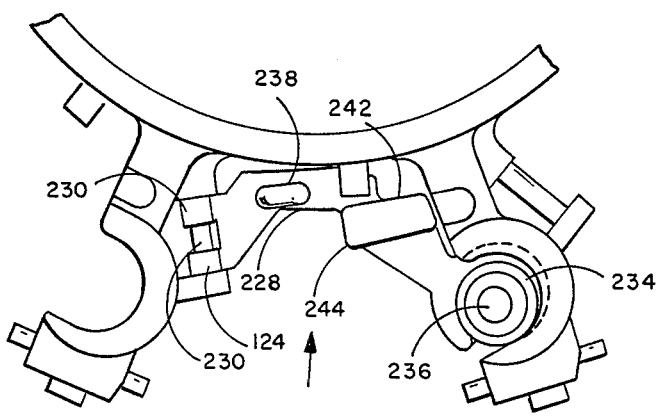
FIG. 47
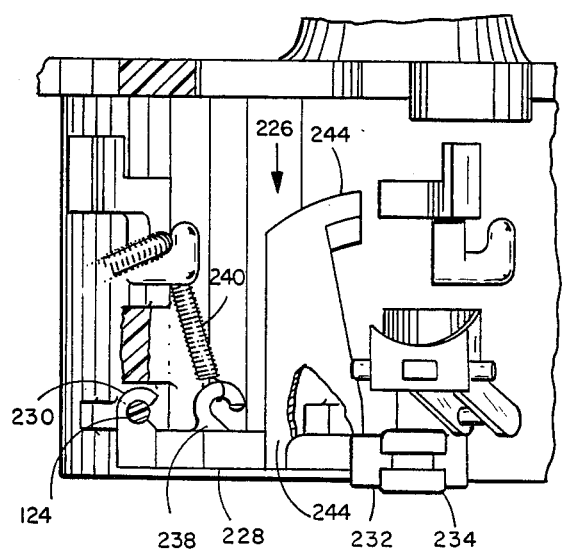
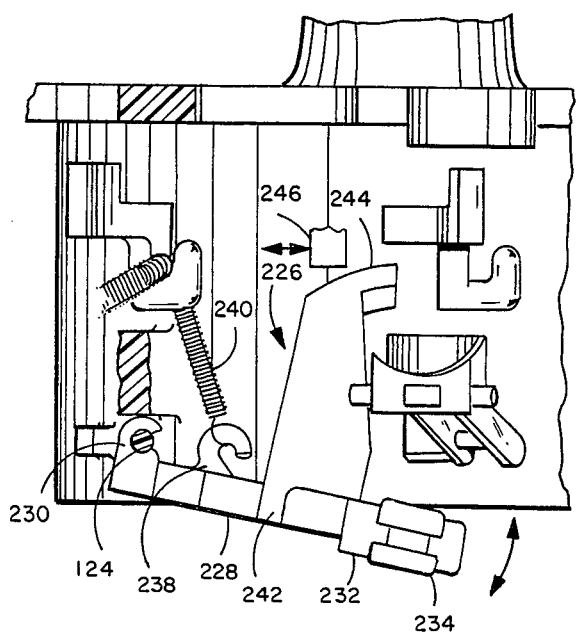
FIG. 48   FIG. 49

GRAPHICS PLOTTER TURRET HEAD

BACKGROUND OF THE INVENTION

The present invention relates to graphic plotters and, more particularly, to a turret head carriage assembly for a graphics plotter which provided a plurality of pens immediately adjacent the point of writing.

Computer graphics is a rapidly expanding technology. The requirements of computer aided design, computer aided engineering, and computer aided manufacture have precipitated the ability to create and display complicated graphics materials. Correspondingly, there has been a rapid increase in the requirements placed upon graphics plotters to create tangible drawings of the displayed graphics for use in the manufacturing process. For one thing, a single pen to be manually changed is not sufficient for most high level applications. With multi-color representations, the pens must be exchanged to create the different colors. Similarly, with liquid ink pens used to create engineering drawings, the pens must be exchanged to get different sized tips thereon for making different width lines as required in various portions of the drawing. Thus, the ability to have automated pen exchanging within the graphics plotter itself has long been a need which, of recent times, has increased in its restrictions.

Several approaches have been employed in the prior art. One example is shown in FIGS. 1–5 wherein the plotter 10 has a movable arm 12 which moves back and forth in the direction of arrows 14 while a movable pen carriage 16 containing gripping fingers 18 to hold a pen 20 moves across the arm 12 in the direction of arrows 22 to create the plot 24 on the writing medium 26. A holding station, generally indicated as 28, is provided adjacent the edge of the plotter 10 and comprises a plurality of adjacent gripping fingers 18, holding pens 20 to be exchanged. To effect a change of pen using the prior art apparatus of FIGS. 1–5, the sequence shown therein must be accomplished. First, the arm 12 and carriage 16 have to leave the point of writing 30 and return the pen 20 in gripping fingers 18 on carriage 16 back to the empty position of holding station 28 as shown in FIG. 2. They then move to the selected pen 20 at holding station 28 as shown in FIG. 3 where the new pen 20 is picked up. Arm 12 and carriage 16 then return to the point of writing 30 as shown in FIG. 4 whereupon the plot 24 can be continued as shown in FIG. 5.

As can be realized, such a pen exchange routine where the pen being used must be moved from the point of writing to a remote location for the exchange and the new pen return before plotting continues is very time consuming. One way that the prior art has attempted to solve this is by the use of a pen carriage having a turret head such as that indicated as 32 in FIGS. 6 and 7. In such prior art devices, the movable pen carriage 16 on the movable arm 12 is provided with a turret head 32 having a central portion 34 rotatable about a central shaft 36 as with a stepping motor (not shown). About the central portion 34 are disposed a plurality of writing stations 38, each configured as shown in FIGS. 8 and 9. The writing stations 38 each comprise a solenoid type arrangement wherein the pen 20 is contained within a movable armature housing 40 within a coil 42 and held in the raised position as with coil spring 44. Assuming the writing station 38 labeled "0" is the active point of writing, to use the pen in writing station 38 labeled "2", the entire central portion 34 and all the writing stations 38 are rotated from the position of FIG. 6 to the FIG. 7. The coil 42 of the writing station 38 at location "2" is then activated by the application of current to the wires 46 of coil 42 causing the armature 40 to be drawn downward against the bias force of spring 44 to place the tip 48 of pen 20 in contact with the writing medium. As will be appreciated, since each writing station 38 has a coil 42 and armature 40, the total weight of the turret head 32 can become quite large. Accordingly, the turret head 32 possesses a high inertia. In very large, very expensive graphic plotters, such weight and its attendant inertia was not a major factor.

Recently, however, small-sized, low-cost personal computers have been introduced into the technical marketplace to perform high quality work. Because of their low cost, they can be afforded by many individuals and small businesses who could not otherwise afford computer capability and have, therefore, gained rapid acceptance. Accordingly, the peripherals, including the graphics plotters, have had to effect a similar reduction in cost and size in order to remain competitive. For the home enthusiast, it has been possible to accomplish the production of a low-cost, multi-pen plotter by using felt tipped pens as the writing medium. For high-quality drafting applications, however, traditional liquid ink type pens to produce India ink drawings on Mylar or other suitable writing mediums are required. To use such a drafting type pen, the plotter literally must be designed around the existing standard structure of the writing tip. To employ liquid ink type drafting pens in a configuration such as that of FIGS. 6 and 7, or by putting, for example, eight individually activated writing stations such as that shown in FIGS. 8 and 9 in an in-line configuration produces a writing head which is both large and cumbersome, as well as overweight and with a high inertia, unable to operate within a lightweight, low-cost environment.

Wherefore, it is the object of the present invention to provide a turret head assembly for use in a graphics plotter which will hold a plurality of liquid ink drafting type writing pens while being small in size and low in weight/inertia.

SUMMARY

The foregoing objective has been accomplished by the turret head assembly of the present invention which is substantially all of injection molded plastic and which comprises a base plate member attached to the moving pen carriage of the plotter; a turret mounted on the base plate member for rotary motion about a first axis normal to the base plate member; first drive means for selectively rotating the turret about the axis between previously selected main positions and sub-positions of each of the main positions, the main positions being radially equally spaced and equal in number to the number of pens to be carriable by the turret head, the sub-positions being equal in number to the main positions and each being a fixed radial distance from its respective main position, one of the main positions being designated as the "writing" position and one of the main positions being designated as the "home" position with respect to which the main positions are numbered for identification purposes, the base plate member having access therethrough adjacent the writing position through which the writing tip of a pen can pass to contact a writing medium disposed beneath the plate member for writing thereupon; a plurality of first pen gripping arms extending radially outward from the spindle horizontal to the base plate member at respective ones of the main positions, the arms each having first gripping means for releasably gripping a pen along one edge adjacent the outer end thereof; a pen holder member mounted to the base plate member for movement up and down along a second axis normal to the base plate member between raised and lowered positions; second drive means for selectively moving the pen holder member between the raised and lowered positions; and, a second pen gripping arm extending radially outward from the pen holder member horizontal to the base plate member along a radial line through the first axis, the second arm being disposed adjacent the writing position and adapted to pass vertically between adjacent ones of the first arms and to pass below the first arms when the pen carriage member is in the lowered position and the turret is rotated, the second arm having gripping means for releasably gripping a pen adjacent the outer end thereof and facing towards the first gripping means, the first and second gripping means being adapted to exchange a pen from one gripping means to the other when they are brought together.

The turret, the pen holder, and most of the parts thereof are constructed of injection-molded plastic so as to be lightweight. A single lightweight coil mounted within the pen holder is employed and a single stepping motor rotates the turret. To effect a pen change, the pen holder member is raised, which puts the two gripping members in alignment. The turret is rotated to the subposition wherein the pen on the holder member is transferred to the turret. The pen holder member is then lowered and the turret is rotated to the new position selected. The pen holder member is then raised and the turret rotated to the subposition whereupon the pen at that position is transferred to the pen holder member. The pen holder member is then lowered, whereby the new writing pen passes through the hole in the base plate to contact the writing medium and the plot continues.

DESCRIPTION OF THE DRAWINGS

FIG. 28 is an end elevation of the pen holder.

FIG. 29 is a bottom view of the pen holder.

FIG. 30 is the other side elevation of the pen holder.

FIGS. 31-33 are back, top, and side elevations, respectively, of the gripping finger of the pen holder.

FIGS. 34-35 are cutaway details of the pen holder showing the manner of operation of the gripping finger.

FIGS. 36-38 are back, side and top views of the gripping fingers on the turret arms.

FIGS. 39-40 show the movement of the turret gripping finger.

FIGS. 43-44 are side and top views of a pen capping arm.

FIG. 45 is a plan view of the pen cap which mounts to the arm of FIGS. 43, 44.

FIG. 46 is a cutaway view through the cap of FIG. 45 in the plane XLVI—XLVI.

FIG. 47 is a plan view showing the pen capping arm of FIGS. 43 and 44 mounted to the turret and with the cap of FIGS. 45 and 46 in place.

FIGS. 48-49 show the manner of operation of the pen capping and uncapping mechanism employed in the present invention.

DESCRIPTION OF THE PREFERRED EMBODIMENT

Figure 1:
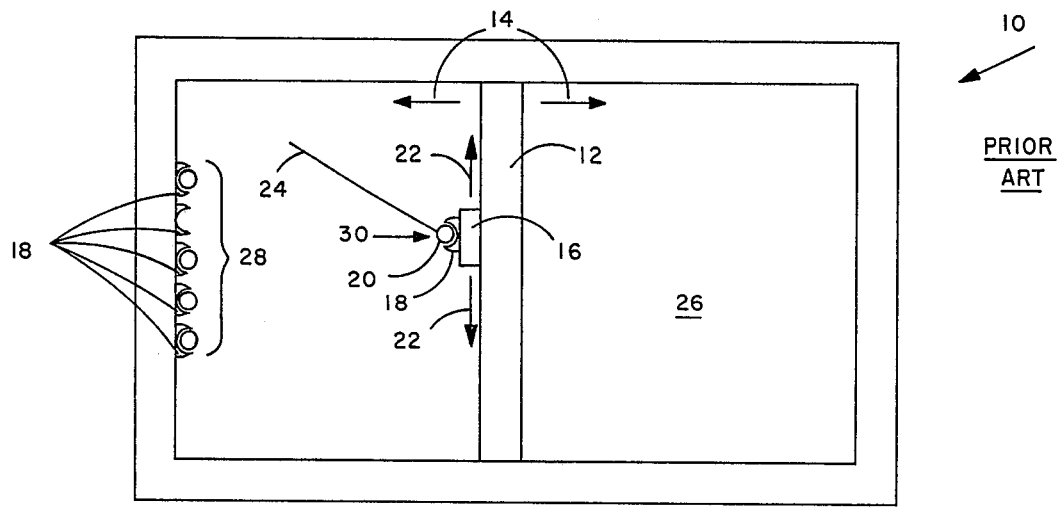
FIGS. 1-5 are simplified plan views of a prior art pen changing technique requiring that the pen carriage be moved to an off plot station to effect a pen transfer.
Figures 2, 3:
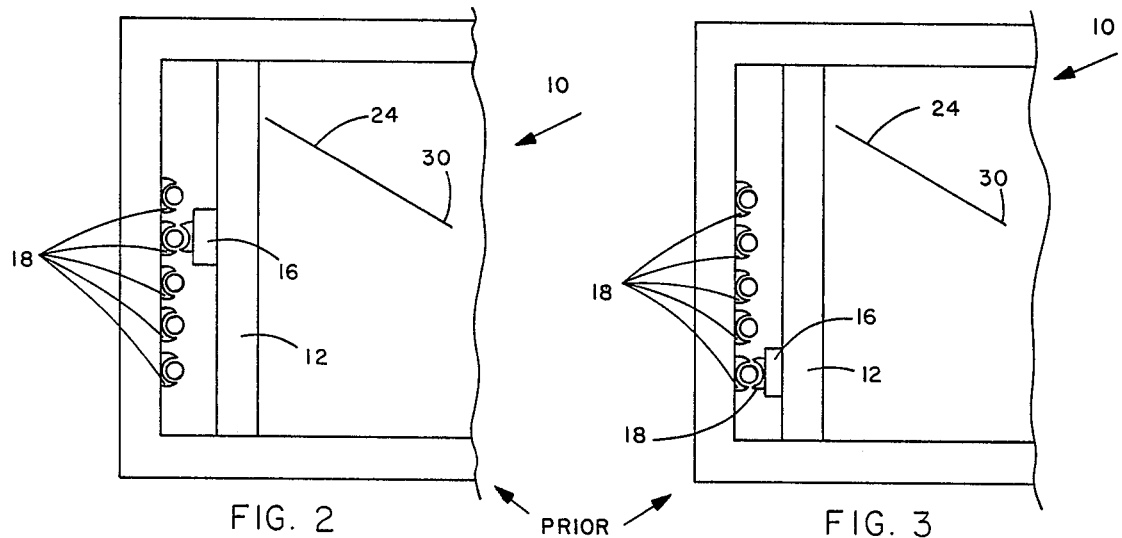
Figures 4, 5:
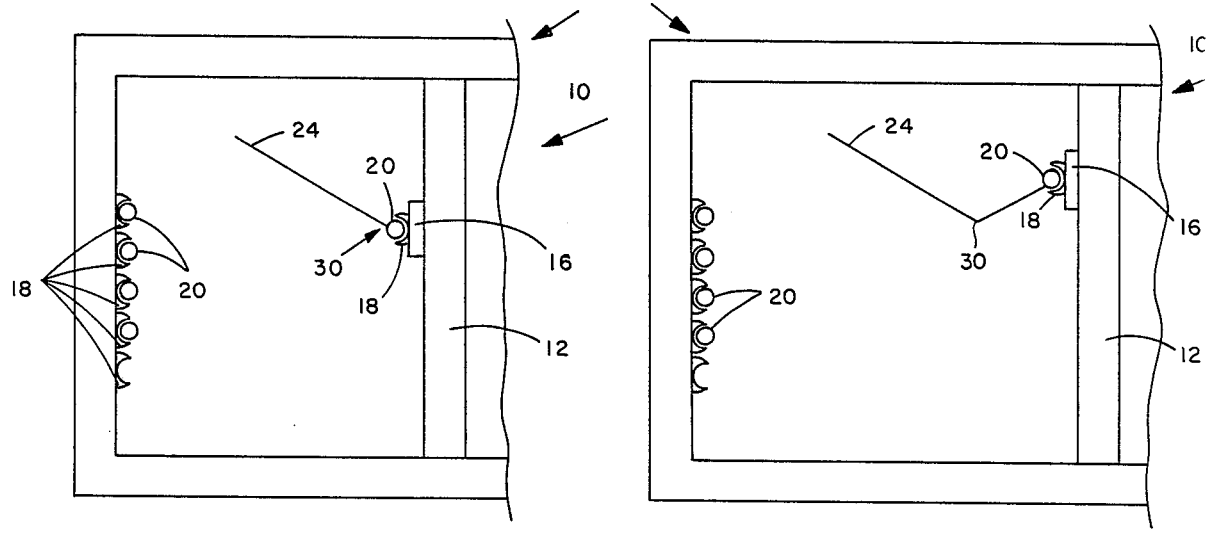
Figure 6:
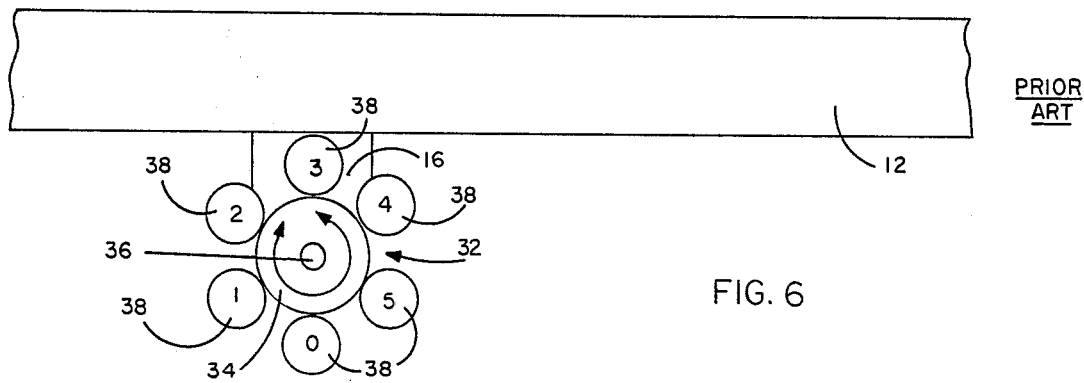
FIGS. 6 and 7 are simplified plan views of a prior art turret type pen mechanism.
Figure 7:
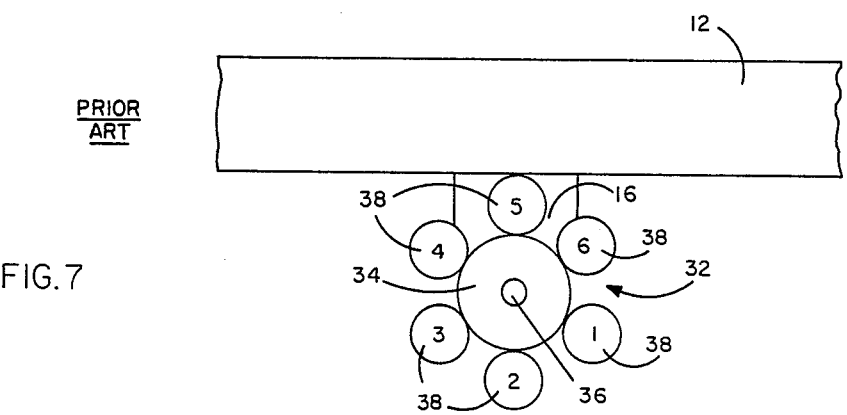
Figure 8:
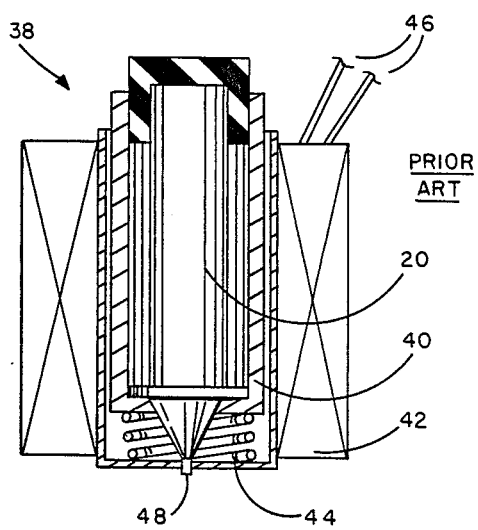
FIGS. 8 and 9 are cutaway views through the type of individual solenoid pen stations as employed in the prior art turret head of FIGS. 6 and 7 showing the pen in its raised and lowered positions, respectively.
Figure 9:
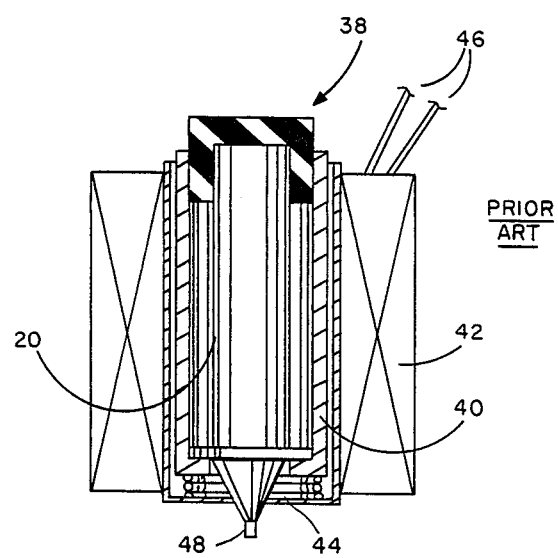
Figure 10:
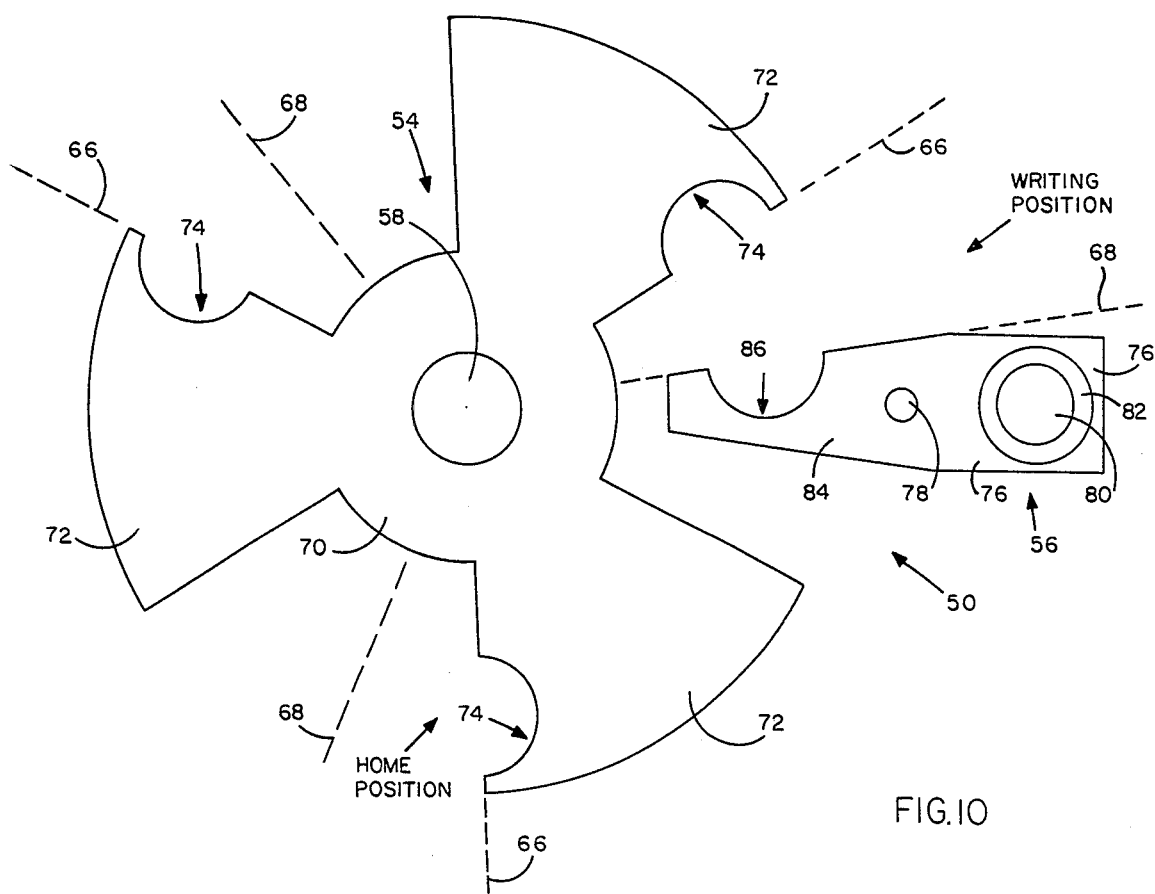
FIGS. 10-14 are simplified plan views of the basic elements of the present invention showing the manner of operation thereof.
Figure 11:
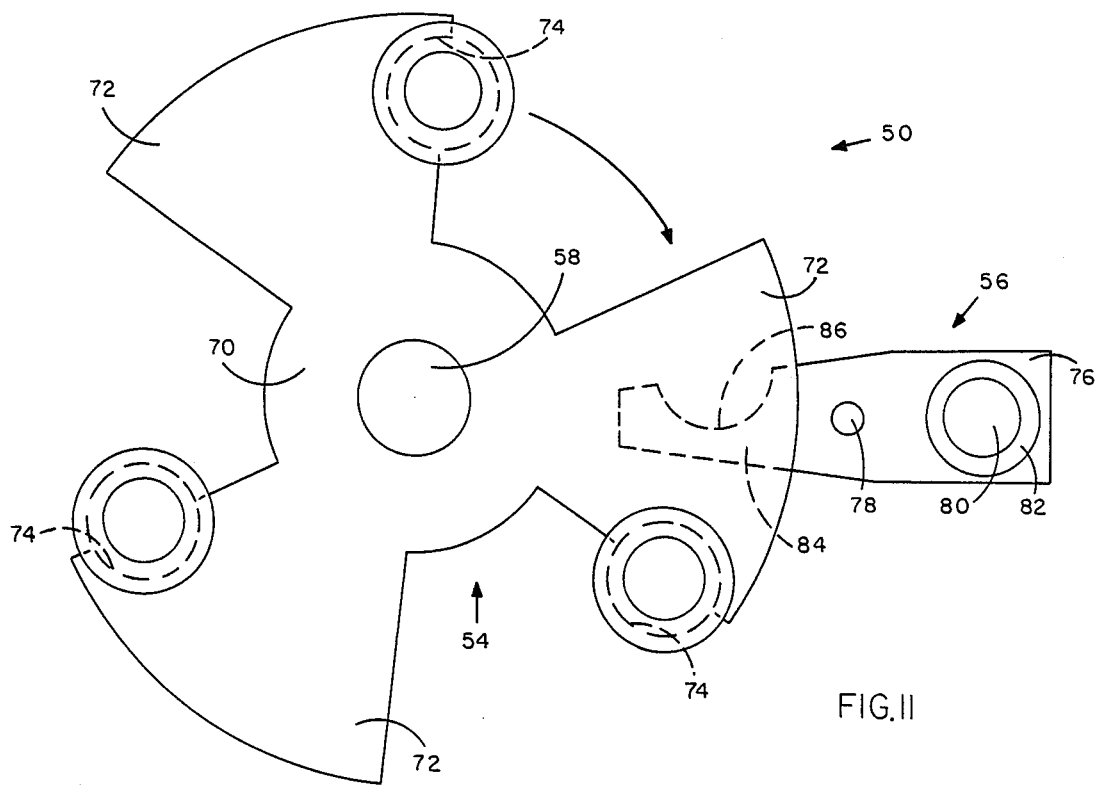

Referring first to FIGS. 10-18, the basic construction and manner of operation of the turret assembly of the present invention is shown in simplified form. The turret assembly, generally indicated as 50, comprises a base plate 52 having a turret 54 and pen holder assembly 56 mounted thereto. The turret 54 has a shaft 58 carried by the base plate 52 for rotation about an axis 60 normal to the base plate 52 as by a stepping motor shown symbolically as 62. The stepping motor 62 is adapted to rotate the shaft 58 (and thereby the remaining components to be described shortly) between radially equally spaced main positions and sub-positions which are equal in number to the number of pens to be carriable by the turret 54. The main positions are indicated by the dashed lines labeled 66 while the sub-positions are indicated by the dashed lines labeled 68. One of the main/subpositions 66, 68 is designated as the "writing" position, while another is designated as the "home" position. This will be discussed in greater detail shortly.

The shaft 58 has a central hub 70 attached thereto for rotation therewith from which radiate radially outward therefrom horizontal to the base plate member 52 a plurality of first pen gripping arms 72 at positions corresponding to respective ones of the main positions 66. In the example being described, the turret 54 is adapted to hold three pens, so there are three pen gripping arms 72 spaced 120° apart, corresponding to the similarly radially displaced main positions 66. Each of the pen gripping arms 72 has first gripping means generally indicated as 74 adapted for releasably gripping a pen along one edge adjacent the outer end thereof.

The pen holder assembly 56 comprises a pen holder member 76 mounted to the base plate 52 for movement up and down along a second shaft 78 with its axis normal to the base plate 52. The pen holder member 76 is slideable along the shaft 78 between the lowered position of FIG. 15 and the raised position of FIG. 16. An armature shaft 80 is mounted adjacent shaft 78 and parallel thereto and cylindrical voice coil 82 is disposed about the shaft 80 and attached to the pen holder member 76 whereby through the application of current to coil 82 opposing the force of a spring (not shown), the pen holder member 76 can be moved between the raised and lowered positions.

A second pen gripping arm 84 is carried by the pen holder member 76 extending radially outward from the holder member 76 horizontal to the base plate 52 along a line passing through the axis 60 of shaft 58. As can be seen from the plan view of FIG. 10, this places the arm 84 between adjacent arms 72 at the subposition 68 of the writing position. Thus, the pen gripping arm 84 is adapted to pass vertically between adjacent ones of the arms 72 as the pen holder member 76 is raised and lowered between its above-described two extreme positions and to pass below the arms 72 when it is in its lowered position and the turret 54 is rotated. Arm 84 has pen gripping means generally indicated as 86 for releasably gripping a pen disposed adjacent the outer end thereof and facing towards the gripping means 74 of the arms 72. The pen gripping means 74, 86 are of a type known in the art (but of a special design as will be described in greater detail hereinafter) adapted to exchange a pen from one gripping means to the other when they are brought together.

Figure 16:
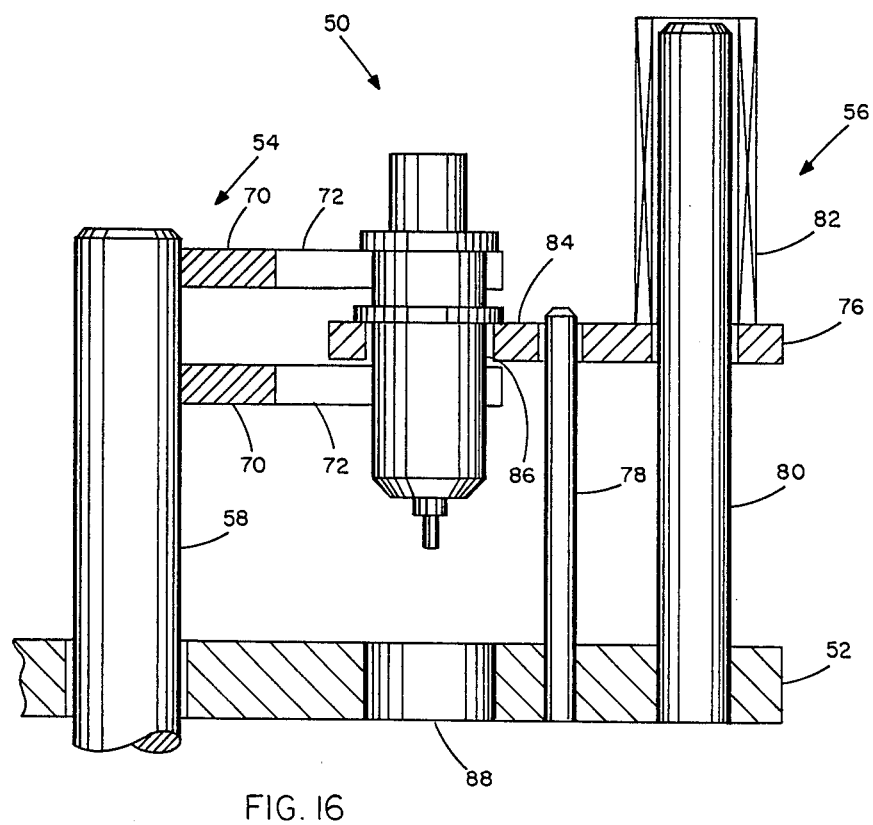
FIGS. 16-18 are partially cutaway side elevations of the apparatus of FIGS. 10-14.

The manner of operation of the turret head of the present invention is as follows. Assume that each of the arms 72 contains a pen 20 held by gripping means 74. Pen holder assembly 56 is lowered to the position of FIG. 15 and the turret assembly 54 rotated by stepping motor 62 to rotate the selected arm 72 (counted from the home position) to the writing position main position 66. The pen holder assembly 56 is then raised corresponding to FIGS. 12 and 16. The turret assembly 54 is then rotated to the sub-position 68 of the writing position as shown in FIGS. 13 and 16 causing the pen 20 to be transferred from the gripping means 74 of arms 72 to the gripping means 86 of arm 84. The turret assembly 54 is then rotated counterclockwise back to the main position 66 of writing position 68 corresponding to FIGS. 14 and 17 whereby the pen 20 remains held by gripping means 86 but arm 72 is moved to a clearance position with respect to the arm 84 and pen 20. The pen holder assembly 56 is then lowered to the position shown in FIG. 18 which causes the tip of pen 20 to pass through hole 88 provided in the base plate 52 therefor so as to contact the writing medium 90.

Figure 12:
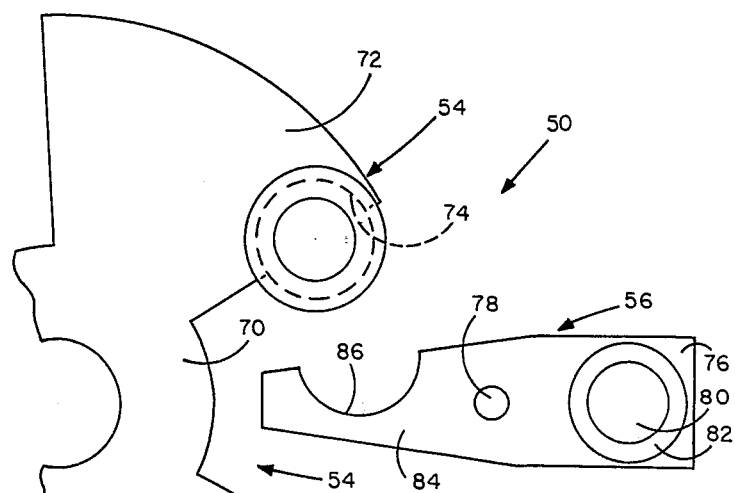
Figure 13:
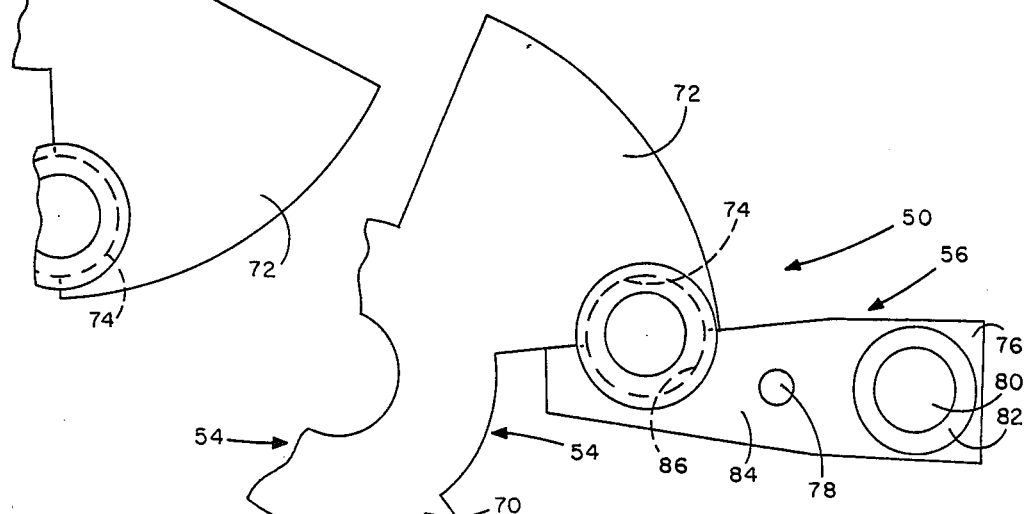
Figure 14:
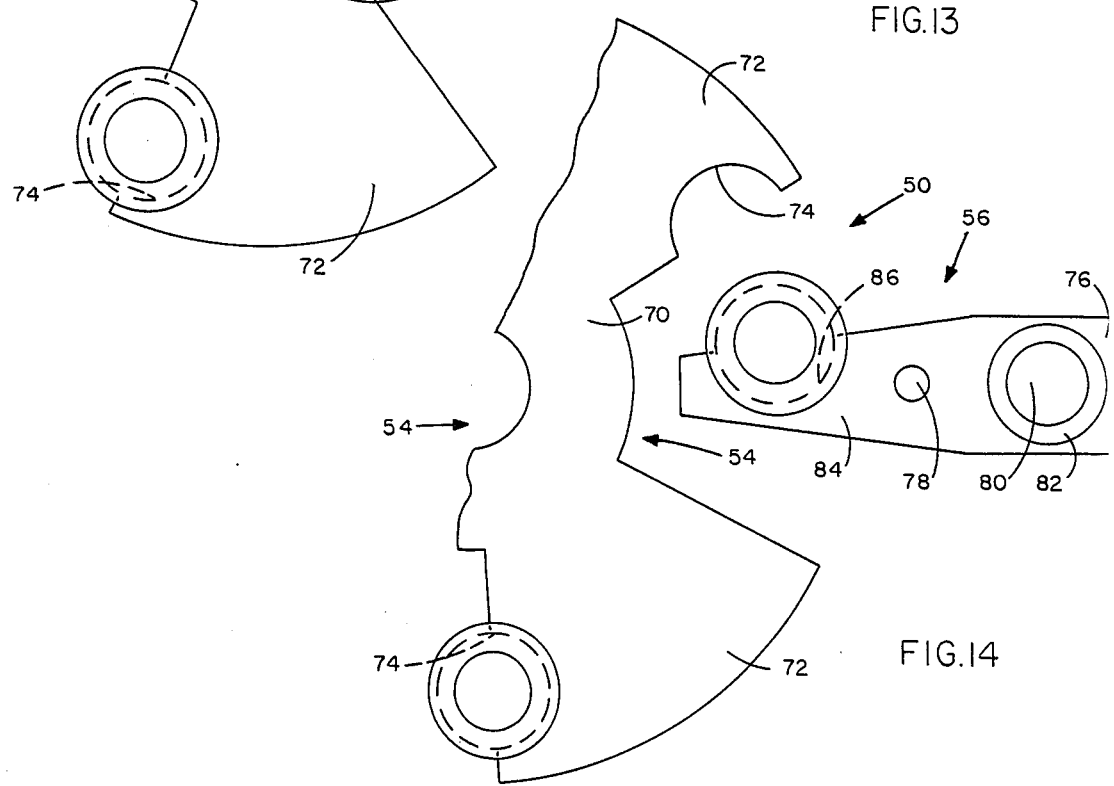
Figure 15:
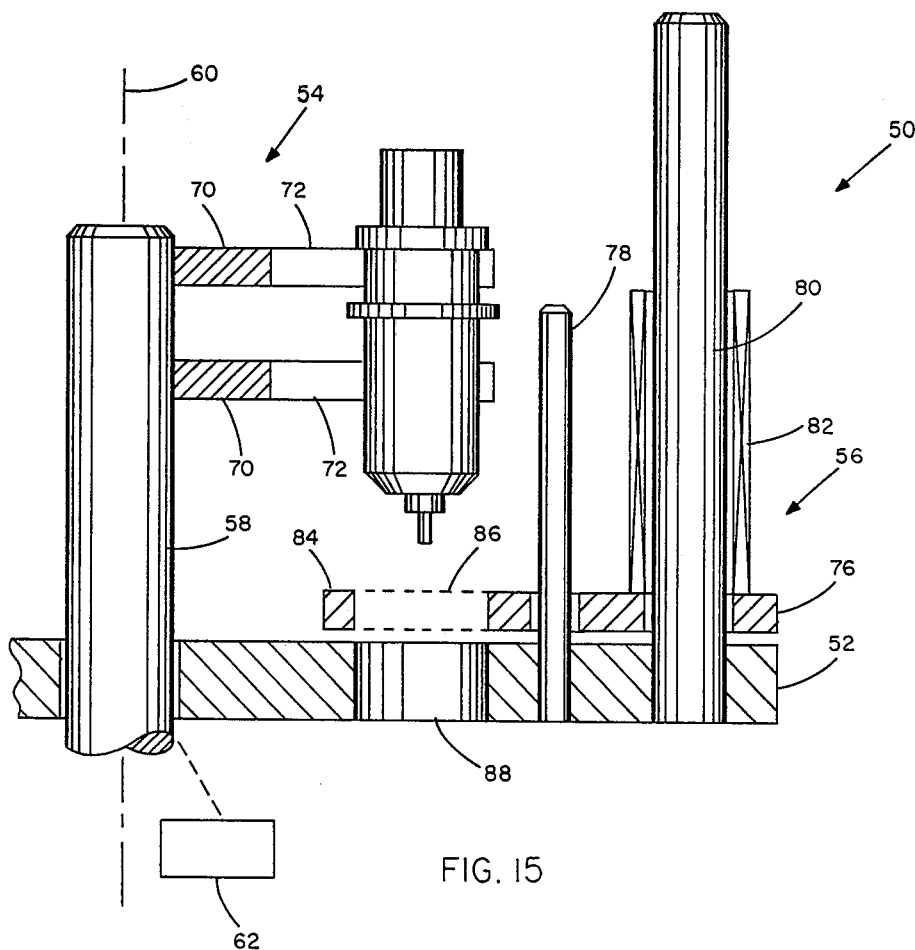
Figure 17:
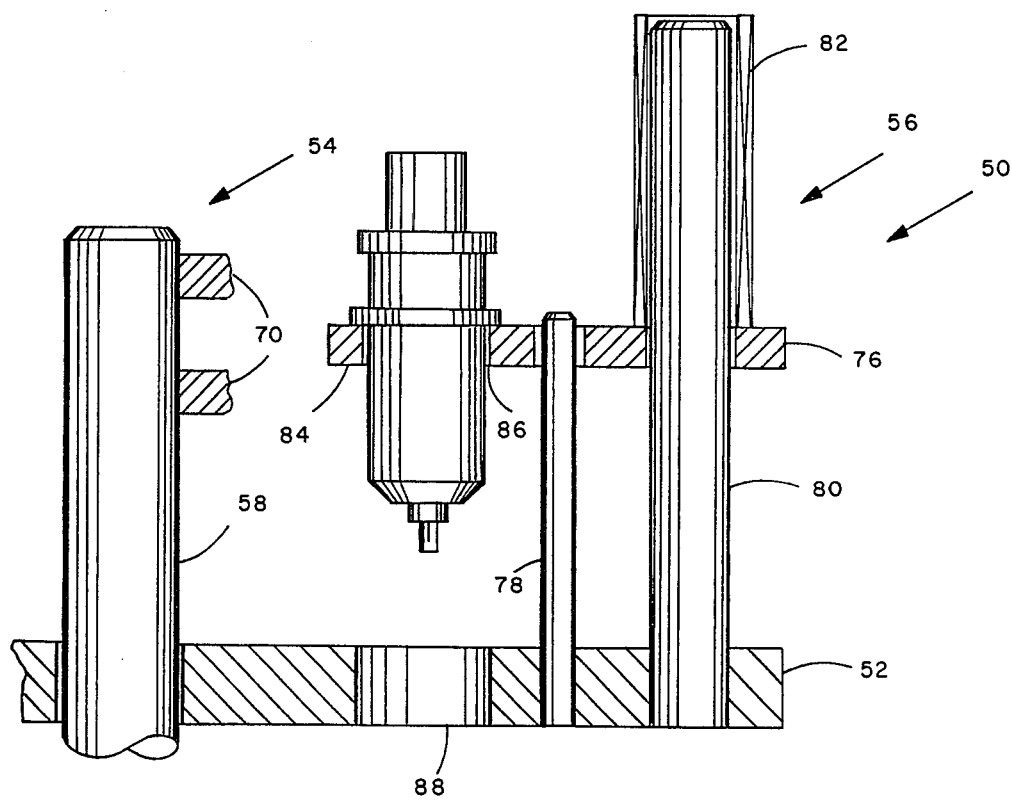
Figure 18:
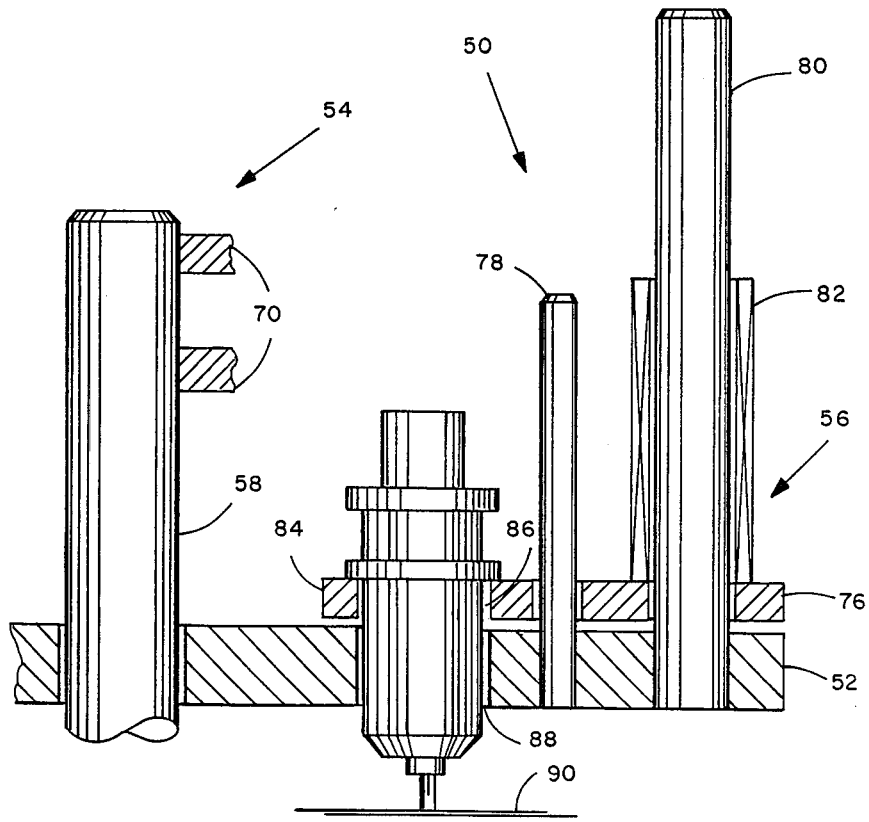
Figure 19:
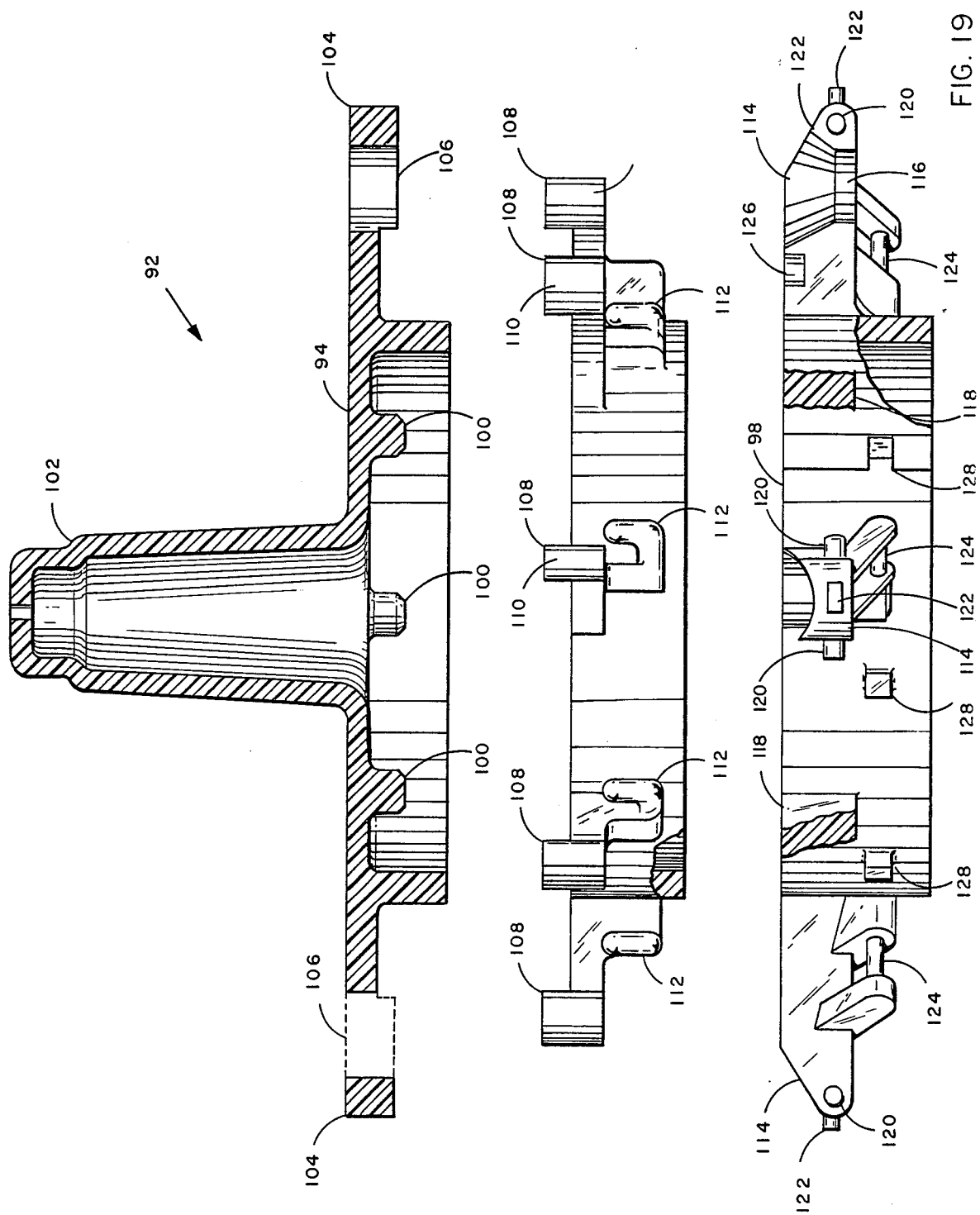
FIG. 19 is a partially cutaway view of the three components employed in fabricating the turret portion of the present invention.
Figure 20:
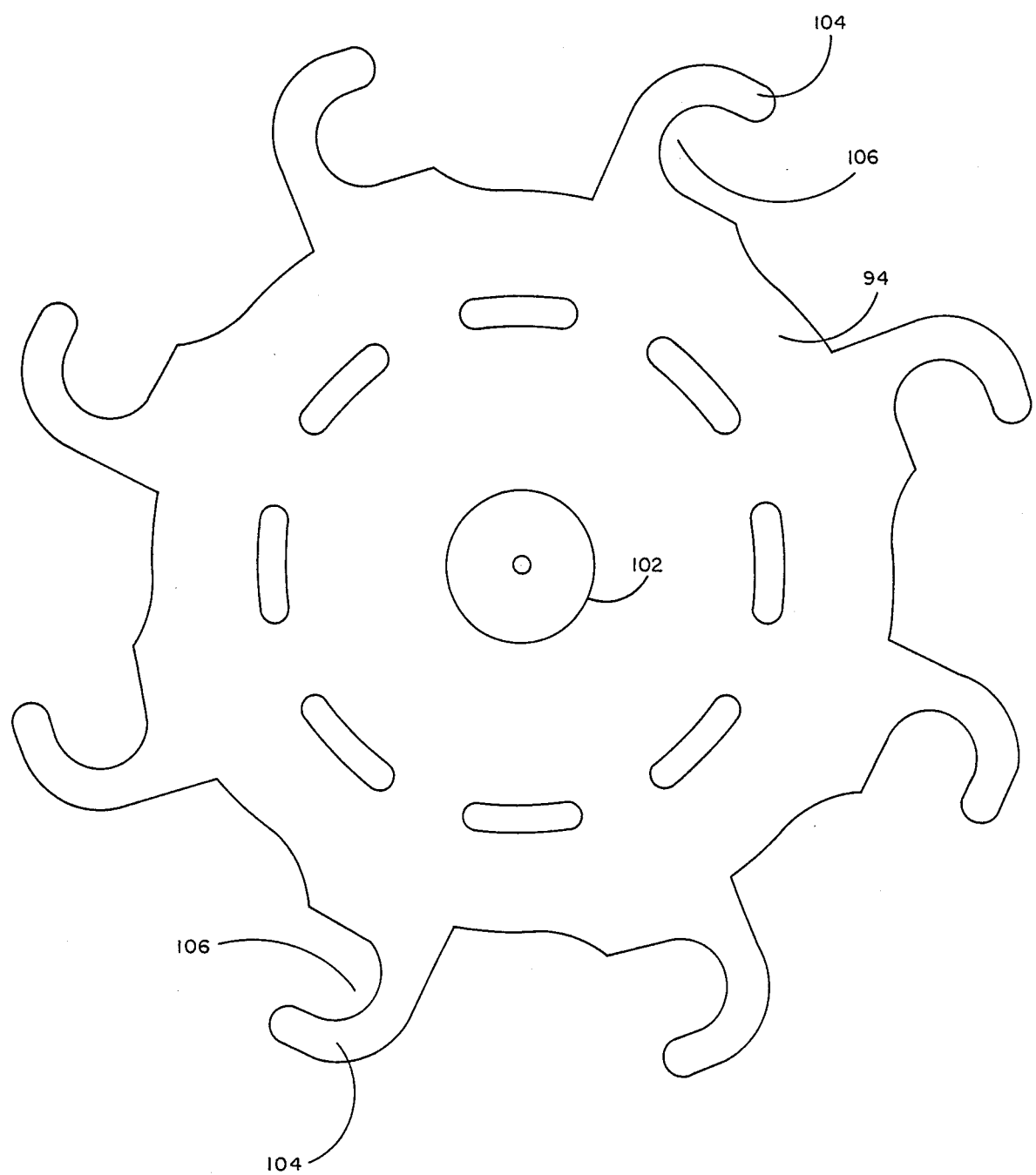
FIG. 20 is a plan view of the top element of FIG. 19.
Figure 21:
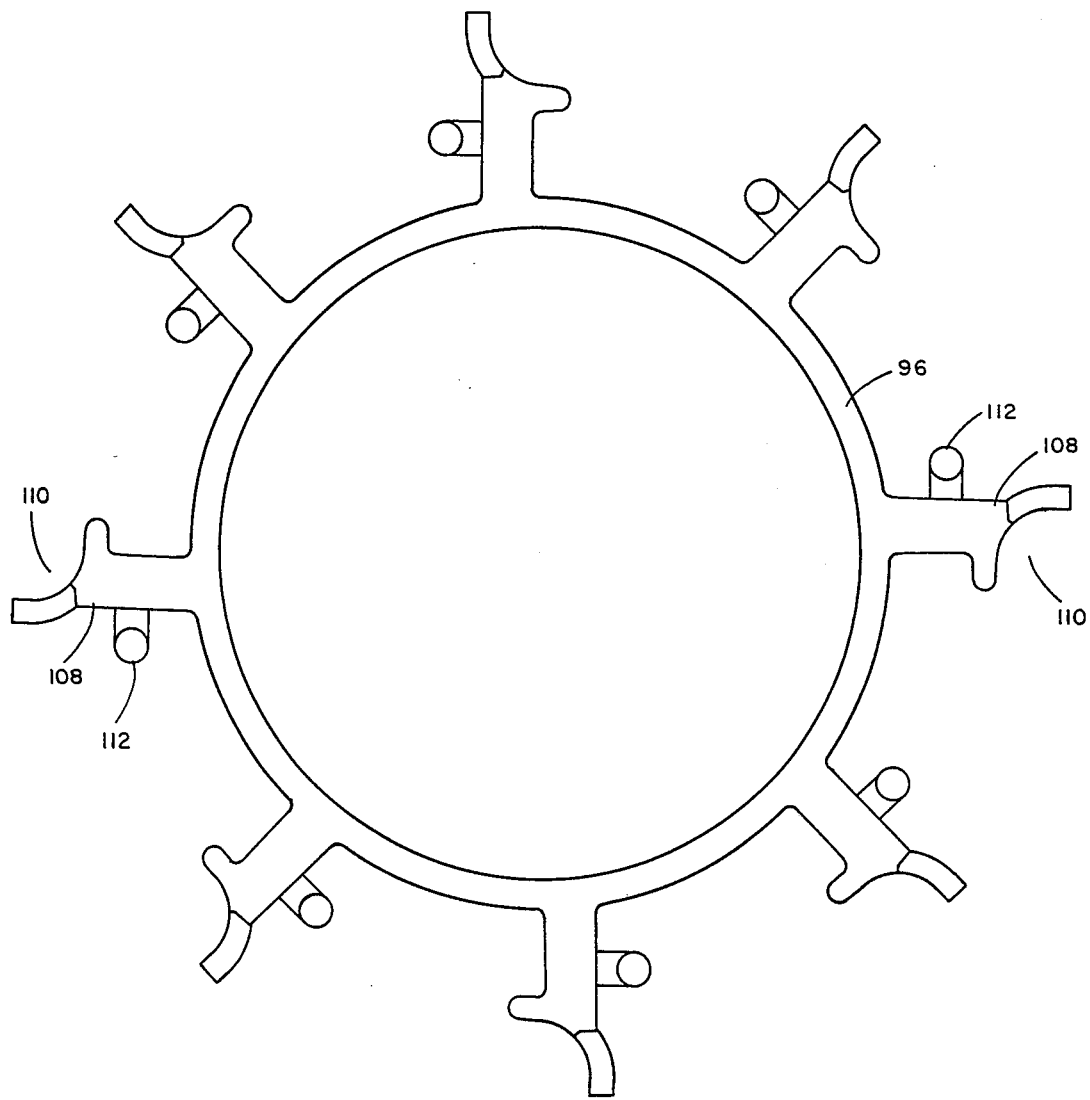
FIG. 21 is a plan view of the middle element of FIG. 19.
Figure 22:
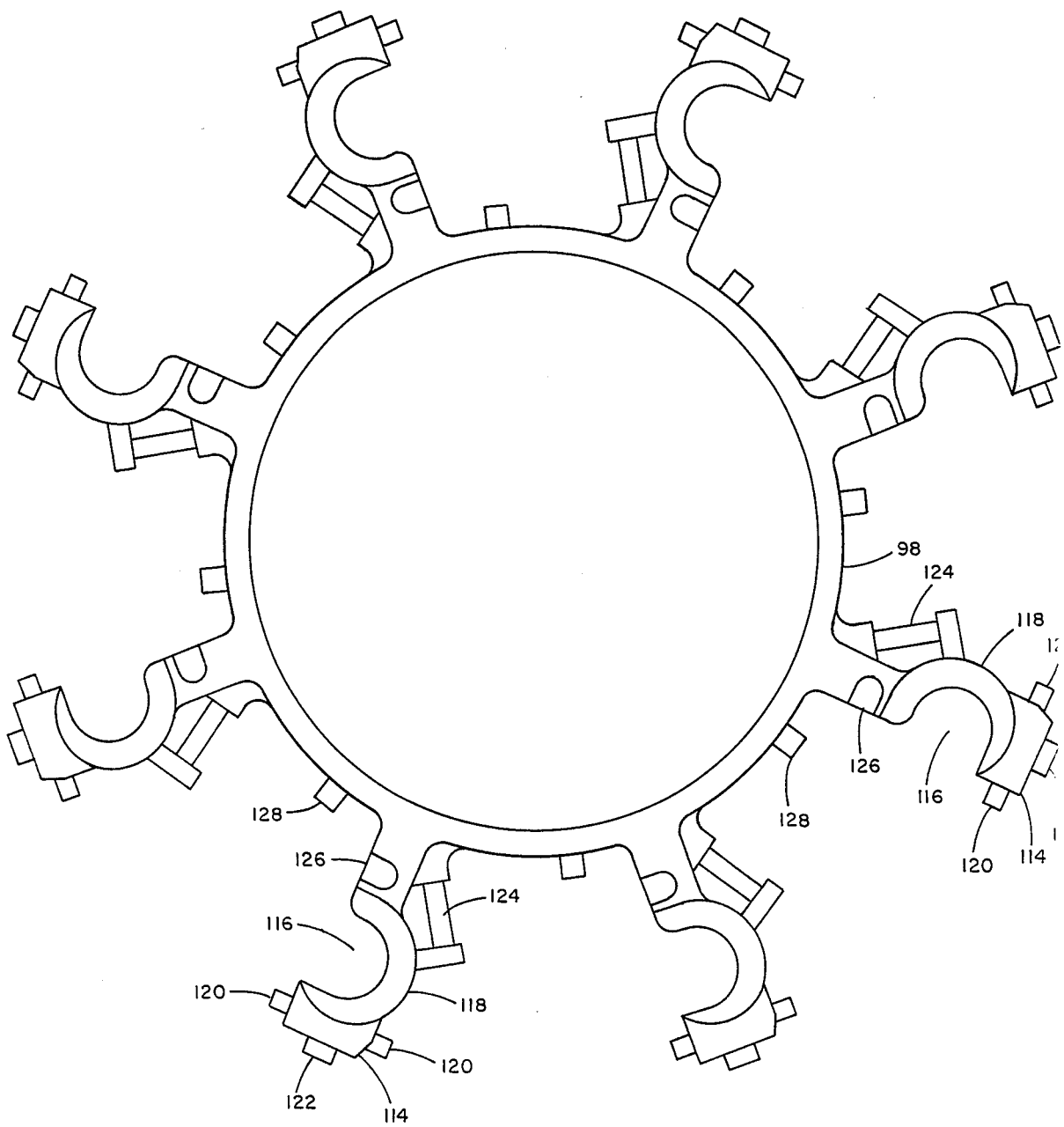
FIG. 22 is a plan view of the bottom element of FIG. 19.
Figure 23:
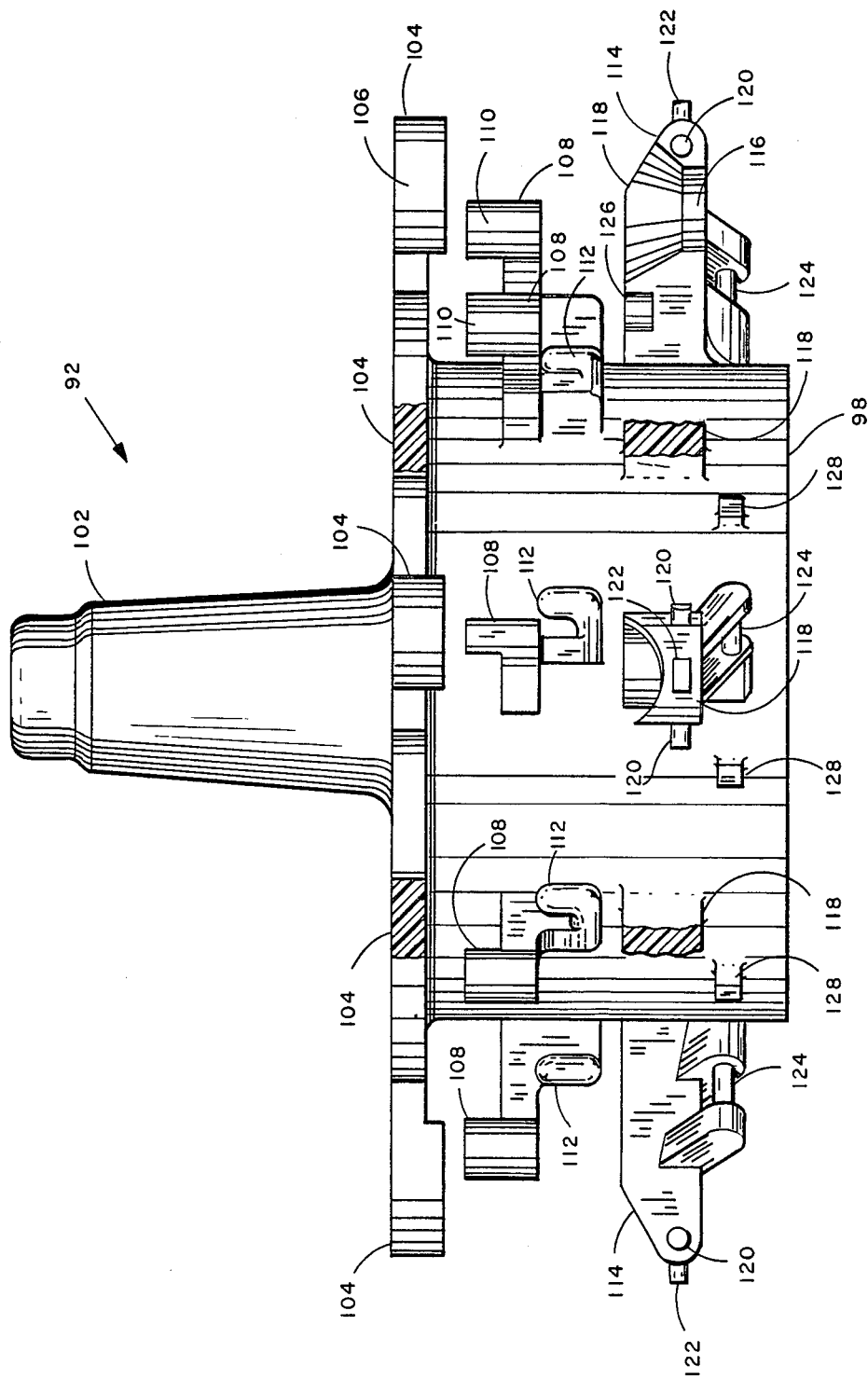
FIG. 23 is a partially cutaway side elevation of the turret of the present invention formulated by bonding together the elements shown in FIGS. 19-22.
Figure 24:
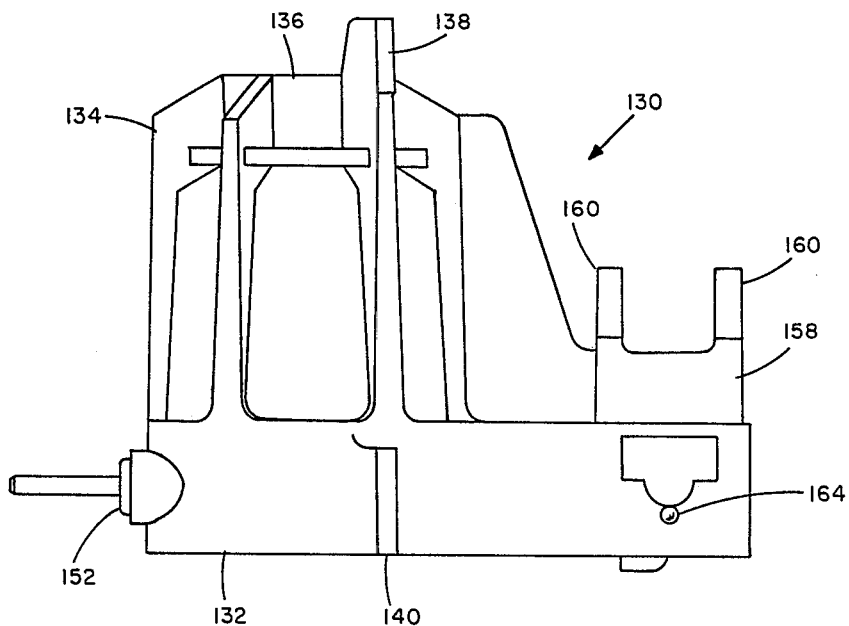
FIG. 24 is a side elevation of one side of the pen holder of the present invention.
Figure 25:
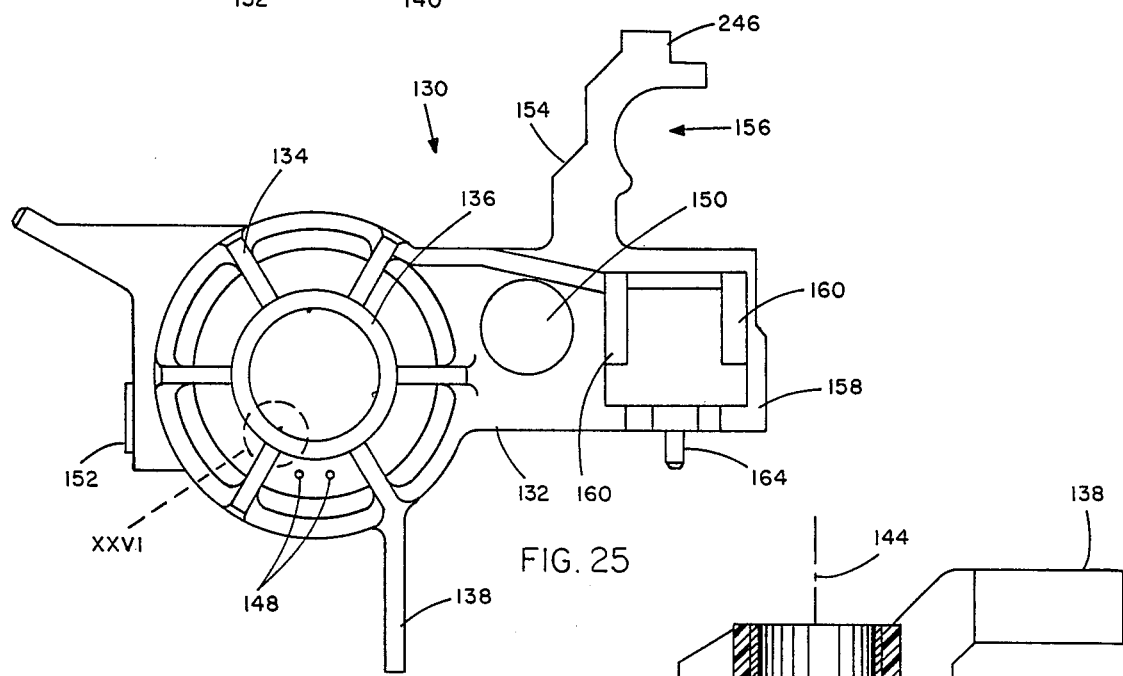
FIG. 25 is a top view of the pen holder.
Figure 26:
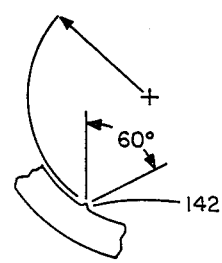
FIG. 26 is a detailed view of the center of the pen holder in the area designated as XXVI.

To exchange pens, the pen holder assembly 56 is once again raised to the position of FIG. 17 whereupon the turret assembly 54 is rotated clockwise to the position of FIG. 13 to transfer the pen 20 and then rotated clockwise back to the position of FIG. 12, whereupon the whole process as described above can be repeated to place another pen in the writing position.

The preferred embodiment as incorporated in a commercial graphics plotter manufactured by the assignee of this application will now be described.

The turret is shown with respect to FIGS. 19-23. The turret, generally indicated as 92, is of molded plastic and comprises an upper section 94, a middle section 96, and a lower section 98 which are welded together to form the hollow, cylindrical turret 92 shown in FIG. 23. The stepping motor 62 is disposed within the hollow, cylindrical interior of sections 94, 96, 98 and engages lugs 100 projecting downward from the top of upper section 94 into members 101 of spindle 103 in order to rotate the turret 92 which is suspended about the raised center cone 102 which fits over spindle 103 (see FIG. 50). The cylindrical walls of the sections 94, 96, 98 form the hub of the turret 92 from which the pen gripping arms project radially outward as described in the simplified example previously. The commercial embodiment being described is adapted to hold eight pens. Thus, each pen position occupies 45° of circumference. To provide spacing between the arms, therefore, the radial distance between the main positions and sub-positions is approximately 22.5°. As will be readily understood, at this component packing density, the resulting turret is very compact and occupies very little space for the number of pens which can be accommodated. The pen gripping arms labeled 72 in the simplified embodiment in actual fact in the commercial embodiment are comprised of three segments disposed respectively on the sections 94, 96, and 98. The upper arm portions 104 define a semicircular slot 106 into which a pen can slip to be supported about 180° of its circumference. The middle arm portions 108 define the inner half of a semicircular slot 110 aligned with slot 106 which, as will be seen, forms a portion of the gripping mechanism of the spindle 92. Middle arm portions 108 also have a hook shaped guide 112 projecting from the side thereof, over which a spring, to be described later herein, is attached. The lower arm portions 114 are the most complex as they support both the pen capping mechanism and the pen gripping mechanism for their rotational movements. These two aspects will be described in greater detail shortly hereinafter. Lower arm portions 114 also define a semicircular slot 116 in concentric alignment with slot 106 and half slot 110. The portion of lower arm portion 114 surrounding the slot 116 is a tapered portion 118 adapted to fit the bottom end of the pens used and hold them in position the outer ends of lower arm portions 114 are aligned circular projections 120 over which the gripping arm is mounted. Projecting outward from the end is a stop projection 122 used in conjunction with the gripping arm as will be seen. Projecting outward from the center hub wall portion of lower section 98 is a shaft 124 which is substantially in alignment with the next adjacent lower arm portion 114 over which the pen capping arm therefor is mounted as will also be described in greater detail shortly. The top surface of the lower arm portions 114 close adjacent the hub portion of lower section 98 contains an indentation 126 also used in the pen capping arm assembly. Lastly, stop projection 128 extends outward from the outer wall of the center hub part of the lower section 98 between adjacent lower arm portions 114 which is also used in conjunction with the pen capping mechanism.

Turning now to FIGS. 24-30, the pen holder member of the preferred and commercial embodiment will be described in detail. Pen holder 130 is a single piece of injection molded plastic. Pen holder 130 generally comprises a base portion 132 having a cage structure 134 generally extending upward therefrom to support a cylindrical center hub 136 and an outward extending lowered position indicator tab 138. Extending outward from the base portion 132 is raised position indicator tab 140 which is in a common plane with tab 138. Tabs 138, 140 are used in conjunction with a light source and light sensor, as will be described shortly, to indicate the raised and lowered positions of the pen holder 130 as previously described with respect to the simplified embodiment.

Figure 27:
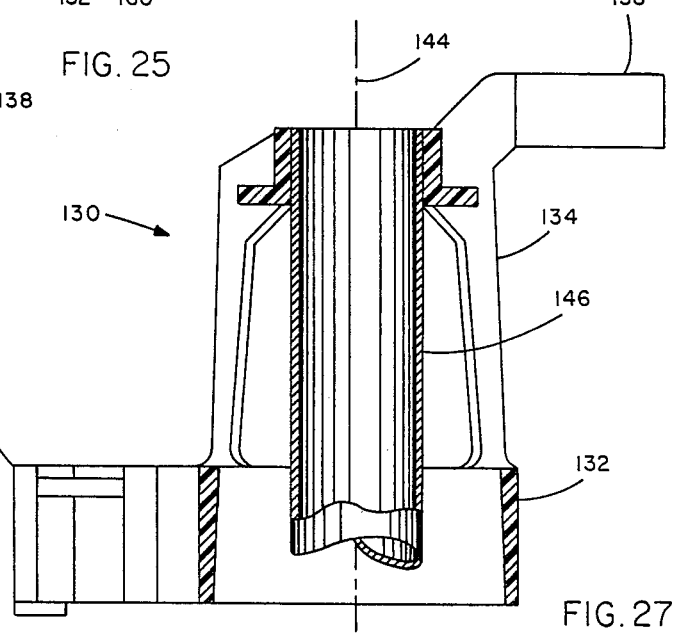
FIG. 27 is a partially cutaway outer end view of the pen holder.

The cylindrical center hub 136 has compressible ridges 142 longitudinally equally spaced around the inner side wall into which a coil, as described in detail in co-pending application, Ser. No. 633,169, filed July, 23, 1984, by the applicant herein, entitled "Two-Stage Pen Head Coil", also assigned to the common assignee of this invention, can be press-fit as shown in FIG. 27. The longitudinal axis 144 of coil 146 is normal to the base portion 132 and adapted to slip over an armature shaft, such as that labeled as 80 in the simplified embodiment, which is parallel to the axis of the turret 92. Holes 142 are provided adjacent the center hub 136 for the passage of the wires (not shown) from the coil 146 for attachment thereof to the required electrical connection for activation in the manner described in greater detail in the above-mentioned co-pending application of applicant herein. The coil as described therein is especially designed to provide high magnetic flux adjacent the raised and lowered positions while generating low heat and requiring less current.

For guidance purposes, the base portion 132 is provided with a cylindrical bore 150 parallel to the axis of the center hub 136 and a boss 152 in a plane parallel to the axis of the center hub 136 which can be fit with bearings to interact with guide pieces on the base plate in a manner to be described hereinafter. Extending outward in a plane normal to the axis of the center hub 136 and the bore 150 is pen gripping arm 154 which defines at the end thereof slightly less than half of a semicircular slot at 156. As will be seen shortly, arm 154 has a gripping mechanism which acts in a manner similar to the middle arm portion 108 of the turret 92. Adjacent the arm 154 is a mounting area of the base portion 132 generally designated as 158 having spaced parallel arms 160 extending vertically therefrom containing slightly greater than semicircular slots 162 into which the gripping member to be described shortly can be snap fit for rotational movement. Projection 164 is provided for the attachment of one end of a biasing spring.

Turning now to FIGS. 31–35, the gripping member 166 of the pen holder 130 will be described. Gripping member 166 has a generally L-shaped body with circular mounting projections extending outward sideways from the top adapted for mating with the slots 162 wherein they can be snap pressed due to the resiliency of the plastic material and there remain for pivotal movement. Projection 170 extends upward at an angle from the top of the body 168 and spring 172 is stretched between projection 170 and projection 164 to urge the lower portion of the L-shaped body 168 towards the back side of slot 162. Extending downward from the inner end of the body 168 is gripping finger 174 which has a generally curved arrow shape to be described in greater detail shortly. It will be noted that since the gripping finger 174 is generally suspended downward from the end of the horizontal portion of the body 168, there is space on both the left and right sides as FIG. 33 is viewed (corresponding to the inner and outer surfaces with respect to a pen within slot 162) as is required for the interchanging action of the two gripping members employed in the apparatus of the present invention. As seen best in FIGS. 34 and 35, absent any other forces, the spring 172 tends to urge the L-shaped body portion 168 counterclockwise about the projections 170 thereby urging the gripping finger 174 towards its point of closest proximity to the back of slot 162. The stop portion 176 prevents further counterclockwise motion of the L-shaped body past the horizontal position of closest proximity as shown in FIG. 34. Any outward (i.e., to the left as FIG. 35 is viewed) force tends to rotate the L-shaped body portion 168 clockwise against the biasing force of spring 172 allowing the gripping finger 174 to move away from the back of the slot 162.

The gripping member of the turret 92 is shown and will be described with respect to FIGS. 36–40. The gripping member 178 is shown individually in FIGS. 36–38 and comprises a flat body portion 180 having parallel projections 182 extending therefrom adapted to rotatably snap fit around projections 120 on lower arm portions 114. Extending upward is a gripping finger 184 of a generally curved arrow shape being positioned as a mirror image of the gripping finger 174 of gripping member 166. Extending upward from body 180, finger 184 is adapted to have passing movement on either side (again being inner and outer with respect to a held pen) in the same manner as finger 174. Projection 186 extends outward from body 180 and a spring 188 is connected to projection 186 on one end, passes over the previously described hook shaped guide 112 on lower arm portion 114, and connects to a pen capping arm (to be described shortly) on the other end. Spring 188 tends to urge the body 180 and finger 184 clockwise as FIGS. 39 and 40 are viewed, thus tending to urge the finger 184 towards the back of the half slot 110 and middle arm portions 108. Body 180 contains a slot 190 into which projection 122 of lower arm portion 114 fits. Projection 122 abuts against the bottom edge of the slot 190 and prevents the body 180 from moving too far forward in a clockwise direction so that the finger 184 stops at a proper distance from the back of slot 110. The exact positioning of finger 184 will be understood with reference to the description of the exchanging and gripping action which follows.

Figure 41:
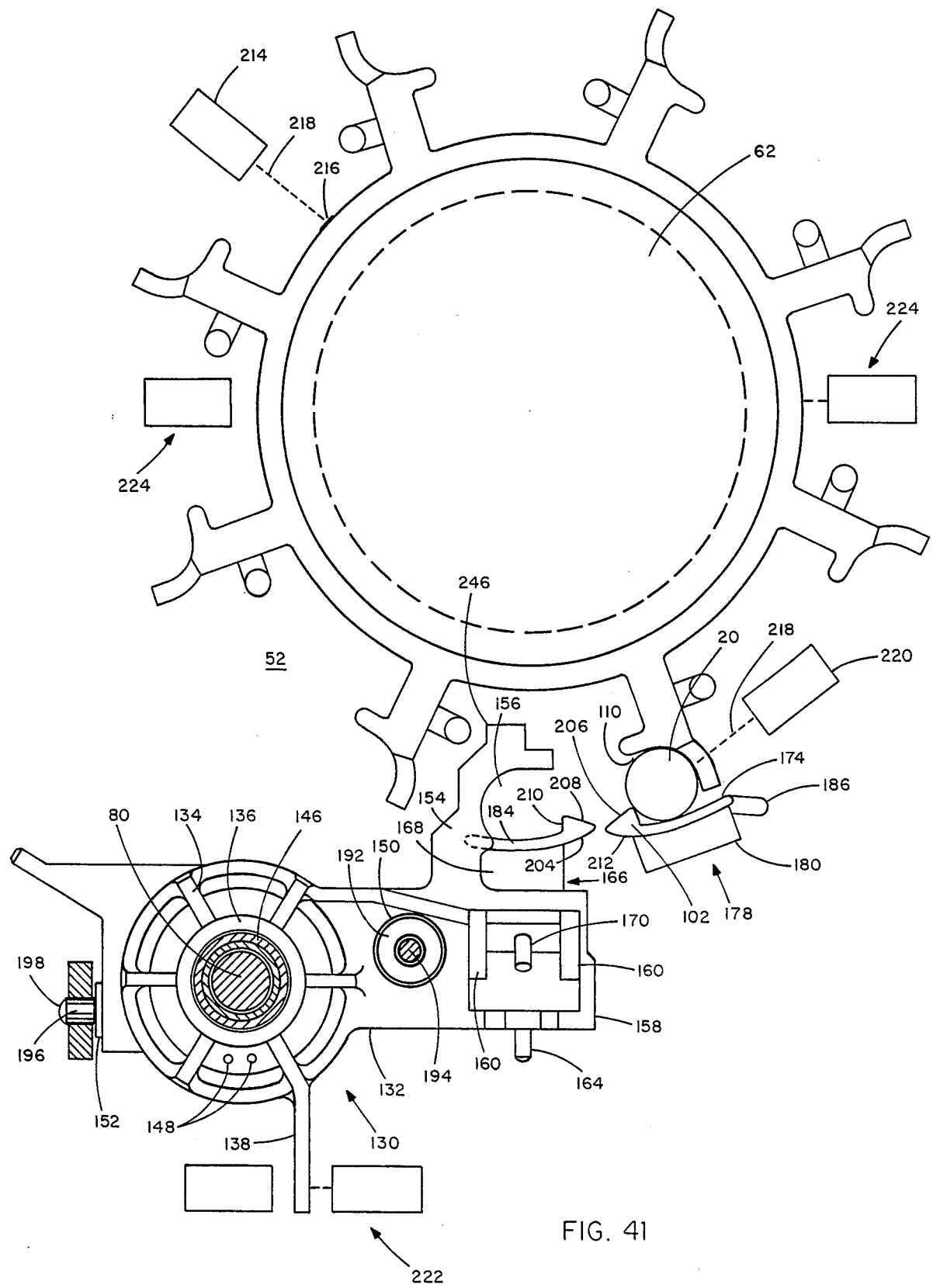
FIG. 41 is a plan view of the turret and pen holder in their operating alignment with the turret gripping a pen.
Figure 42:
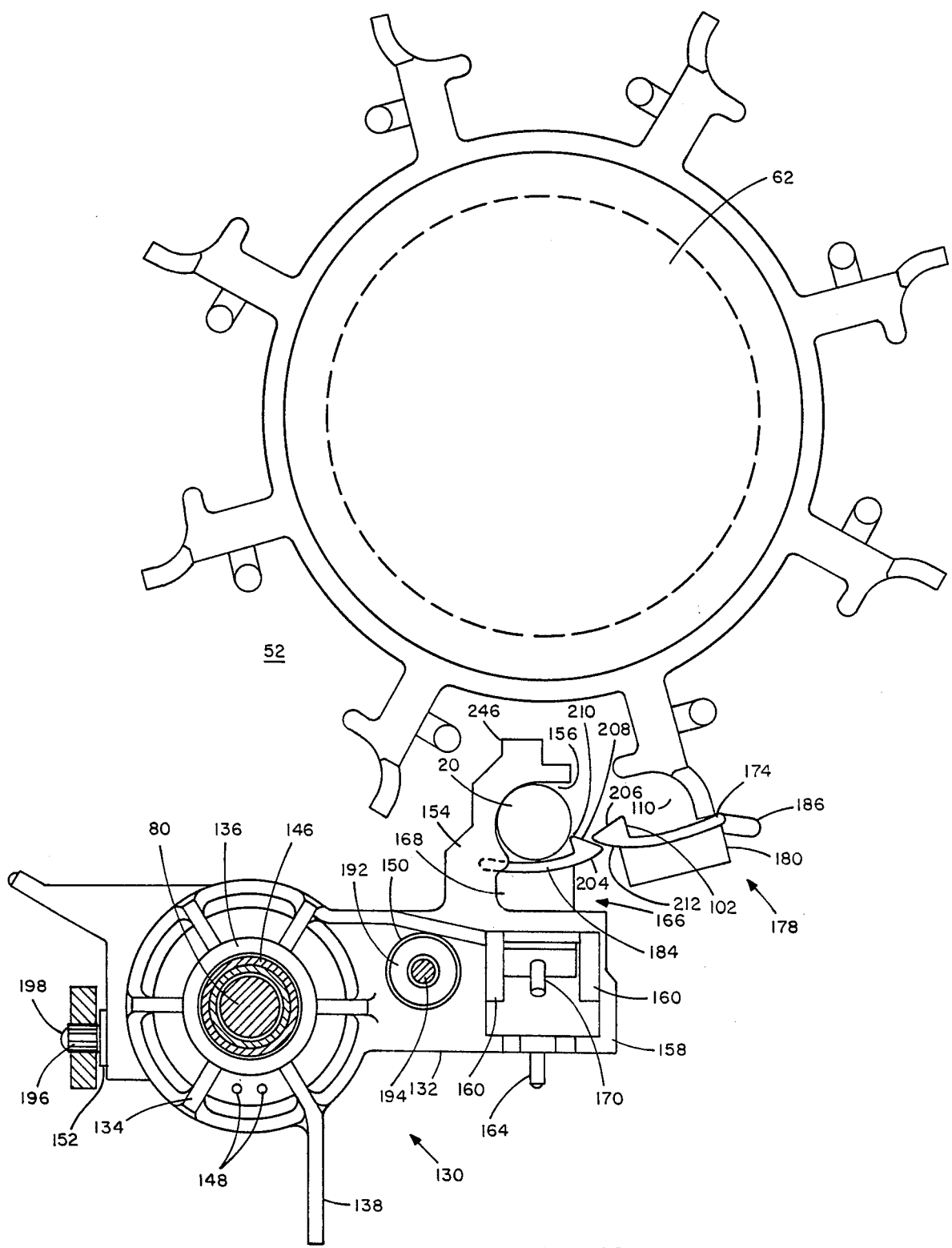
FIG. 42 shows the members of FIG. 43 following an exchange wherein the pen holder is gripping a pen.

Turning now to FIGS. 41 and 42, the operation of the commercial embodiment as above described in its individual components will now be described in detail. For simplicity, superfluous components have been omitted from the figures. It will be understood that each of the arms 104, 108 and 114 will be provided with gripping members 178 as hereinbefore described. Again, for simplicity, FIGS. 41 and 42 show the turret 92 in the plane of the middle section 96 as this is where the gripping action takes place. Both the turret 92 and the pen holder 130 are mounted to an appropriate base plate 52 for attachment to the pen carriage of the moving arm 12 of the plotter 10 into which they are incorporated. Turret 92 is mounted to the base plate 52 for rotation about the center cone 102 by the stepping motor 62 indicated by the dashed line of the figures. Pen holder 130 is attached for precision vertical movement with respect to the plate 52 between the previously described raised and lowered positions by bearings mounted to the previously mentioned bore 150 and boss 152. An annular linear bearing assembly 192 is press fit into the bore 150. A shaft 194 mounted normal to the base 52 passes through the center of the bearing assembly 192. Pen holder 130 can move vertically along the shaft 194 guided by the ball bearings projecting inwardly from bearing assembly 192. To prevent rotation of the pen carriage 130 about the shaft 194, roller bearing 196 is mounted extending normal to shaft 194 to boss 152 as by machine screw 198. Ball bearing 196 is disposed between two parallel members 200 extending upward normal to the base 52. Between the bearing assembly 192 moving on shaft 194 and roller bearing 196 moving between members 200, the pen holder 130 can only move in precision vertically with respect to the base plate 52. Armature shaft 80 is mounted normal to the base plate 52 and is disposed concentrically within the special coil 146 previously described.

As shown in FIG. 41, a pen 20 is held within half slot 110 by the inward force of gripping finger 174 and the inward projection 202 of the arrow shape of the gripping finger 174. Note that as thus positioned, gripping finger 184 has its outward surface 204 inward of the inward surface 206 of the tip of gripping finger 174. Thus, if the spindle 92 is rotated clockwise as FIG. 41 is viewed, outward surface 204 will pass along the inward surface 206 urging the gripping finger 174 outward away from pen 20. Simultaneously, the inward surface 208 of gripping finger 184 will contact the surface of pen 20 urging gripping finger 184 out and around pen 20 as pen 20 is urged into slot 156 by the back of middle arm portion 108 adjacent slot 110. When inward projection 210 of gripping member 184 passes around pen 20, inward projection 102 will be riding along the outward surface 204 of gripping member 184. As turret 92 is then rotated counterclockwise back to the position of FIG. 41, the pen 20 will be gripped by inward projection 210, while inward projection 102 of gripping member 174 slides smoothly off of outward surface 204 of gripping member 184, resulting in the pen being maintained within pen gripping arm 154 of pen holder 130 as shown in FIG. 42. As can be seen in FIG. 42, with the pen 20 within the pen gripping arm 154, the outward surface 212 of gripping arm 174 is positioned just inward of the inward surface 208 of gripping member 184 such that if the turret 92 is rotated clockwise once again, a similar exchanging action will take place between the two gripping fingers 174, 184 as previously described. It can be seen that the stop action of projection 122 in slot 190 must be such that gripping finger 174 is positioned substantially as shown in FIG. 42 close adjacent the inward surface 208 of gripping finger 184. If the tip of gripping finger 174 were allowed to pass more closely to the center of pen 20 or further in towards the center of turret 92, the exchanging action as described would not take place but, rather, gripping finger 174 would be forcibly broken off of arm 114 by pen 20 and arm 154.

Other features of the commercial embodiment of the present invention incorporated therein to assure optimum operation will now be described.

Figure 50A:
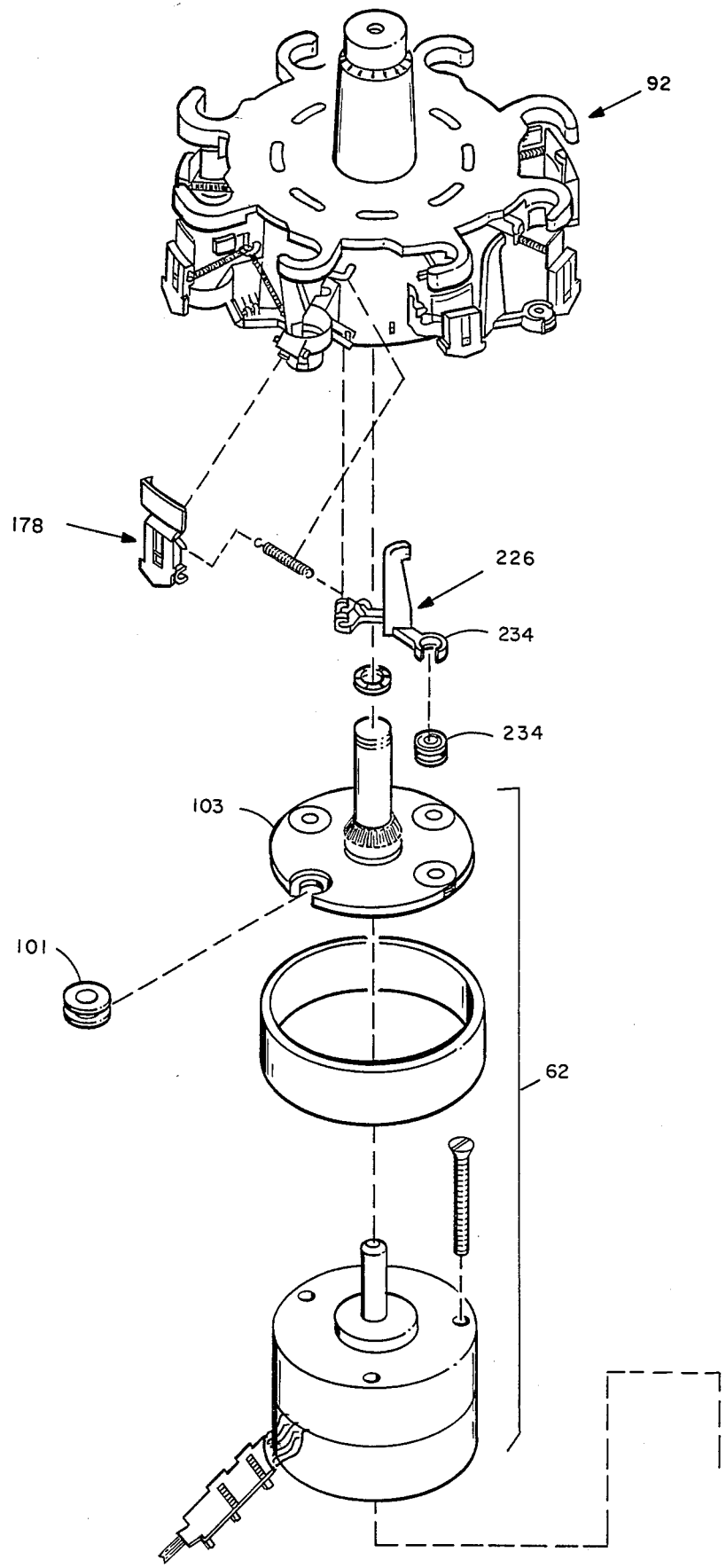
FIG. 50 (comprising a and b portions on two sheets) is an exploded view of the turret head assembly of the present invention.
Figure 50B:
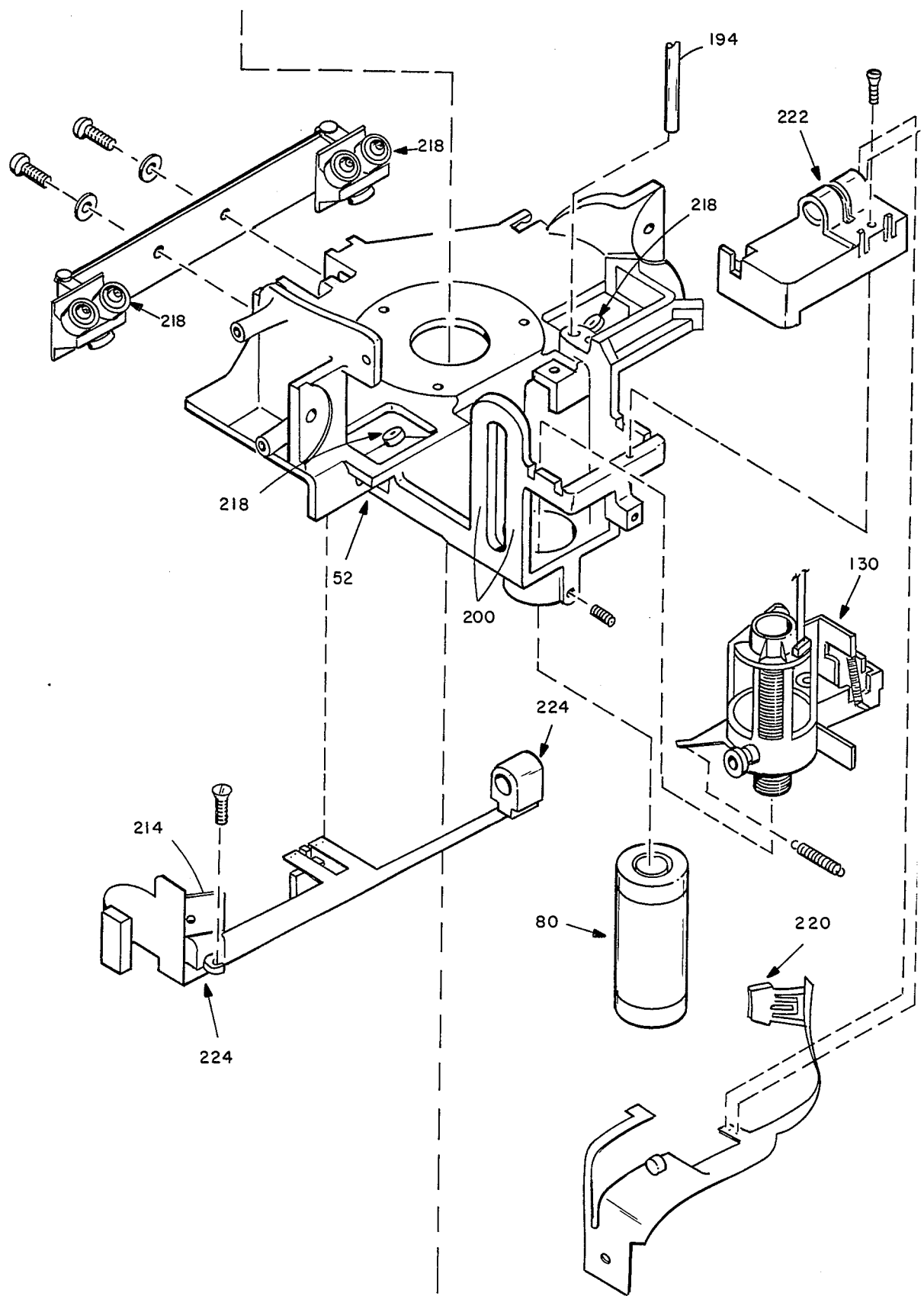

Turning to FIGS. 41 and 50, a home position sensor 214 is provided to sense a reflective spot 216 on the surface of the turret 92 so as to provide an indication of when the turret 92 is in its home position. A second sensor 220 is provided adjacent the home position for reading information about the pen. A third sensor 222 senses the raised and lowered positions of the pen holder 130. Finally, a fourth sensor 224 senses the presence or absence of the turret 92 in the assembly since turret 92 merely sits on the stepping motor 62 and is, therefore, easily exchangeable, whereby a new turret 92 can be substituted rather than having to replace the pens (as is usually the case) when a major pen change is required (i.e., from all felt tip to all liquid ink). All the foregoing are described in detail in co-pending application Ser. No. 633,170, filed July, 23, 1984 titled "Pen Turret Control System" by Charles Gunderson and Aftab Kapadya, also assigned to the assignee of this application.

The baseplate of the present invention is incorporated into the plotter's pen carriage which is supported for movement along a guide track by the guide rollers 218 which are described in detail in co-pending application Ser. No. 633,173 filed July, 23, 1984 titled "Releasable Pen Block Guide" by James Lawrence, also assigned to the assignee of this application.

Finally, turning to FIGS. 43-49, the unique pen capping mechanism of the present invention which automatically and securely caps the pens 20 will be described. It will be appreciated by those skilled in the art that one of the major failings of graphics plotters employing India ink type liquid drafting pen tips is the inability to adequately seal the pen tips. As a result, they quickly dry out such that when an attempt is made to write using the tip, the flow of ink will not start and the pen must be removed and cleaned of the dried ink in a time-consuming process. The pen capping arm of the present invention (one per pen position) is generally indicated as 226. Arm 226 has a horizontal portion 228 having curved fingers 230 on one end adapted to snap-fit for pivotal movement about the shafts 124. The opposite end is provided with curved gripping fingers 232 adapted to releasably grip a sealing cup 234 of silicon sponge rubber having a cavity 236 therein adapted to sealably mate with the tip of a pen. Cup 234, being pliable, can be unsnapped easily from the gripping fingers 232 for cleaning. A hook 238 is formed into the top of horizontal portion 228 and the other end of spring 240 (described above) is connected to hook 238 tending to urge the sealing cup 234 upward towards the bottom of lower arm portion 114 wherein the tip of the pen 20 is positioned. Stop projection 128 is provided to contact the top of the horizontal portion 228 as shown in the cut-through portion of FIG. 48 so that the sealing cup 234 cannot be urged upward beyond the optimal position. Activating arm 242 projects upward from the horizontal portion 228 and has curved activating surface 244 along the top thereof. As can be seen in FIG. 49, as the turret 92 is rotated in the clockwise direction during a pen exchange, the lower surface of projection 246 provided for that purpose on the inner end of gripping arm 154 of pen holder 130 pushes against the activating surface 244 of arm 242 urging the pen capping arm 226 downward to move the sealing cup 234 off the tip of the pen as it is exchanged. As the turret 92 is rotated counterclockwise once again, projection 246 moves off of activating surface 244 allowing the pen capping arm 226 to move back to its raised position of FIG. 48. Because of the length of arm 242 and the distance of movement, indentation 126, previously referred to, is provided as a place into which the upper portion of arm 242 can move into to provide a full range of movement thereof.

Wherefore, having thus described my invention, I claim:

1. In a graphics plotter, a turret head assembly for holding a plurality of liquid ink pens on a pen carriage adjacent the point of writing and for selectively exchanging the pens to be the writing pen, said turret head assembly comprising:

(a) a base plate member carried by the pen carriage;

(b) a turret mounted to said base plate member for rotary motion about a first axis normal to said base plate member;

(c) first drive means for selectively rotating said turret about said axis between previously selected main positions and sub-positions of each of said main positions, said main positions being radially equally spaced and equal in number to the number of pens to be carriable by the turret head, said sub-positions being equal in number to said main positions and each being a fixed radial distance from its respective main position, one of said main positions being designated as the writing position and one of said main positions being designated as the home position with respect to which said main positions are numbered for identification purposes, said base plate member having access therethrough adjacent said writing position through which the writing tip of a pen can pass to contact a writing medium disposed below said plate member for writing thereupon;

(d) a plurality of first pen gripping arms extending radially outward from said turret horizontal to said base plate member at respective ones of said main positions, said arms each having first gripping means for releasably gripping a pen along one edge adjacent the outer end thereof;

(e) a pen holder member mounted to said base plate member for movement up and down along a second axis normal to said base plate member between raised and lowered positions;

(f) second drive means for selectively moving said pen holder member between said raised and lowered positions; and, (g) a second pen gripping arm extending radially outward from said pen holder member horizontal to said base plate member along a radial line through said first axis, said second arm being disposed adjacent said writing position and adapted to pass vertically between adjacent ones of said first arms and to pass below said first arms when said pen carriage member is in said lowered position and said turret is rotated, said second arm having second gripping means for releasably gripping a pen adjacent the outer end thereof and facing towards said first gripping means, said first and second gripping means being adapted to exchange a pen from one gripping means to the other when they are brought together.

2. The turret head assembly of claim 1 and additionally comprising:

means for sensing the presence of a pen in said first gripping means of said first arm at said writing position and for producing an output signal indicative thereof.

3. The turret head assembly of claim 1 and additionally comprising:

means for sensing when said spindle is at said home position and for producing an output signal indicative thereof.

4. The turret head assembly of claim 1 and additionally comprising:

means for sensing when said pen carriage member is in said raised and lowered positions and for producing respective output signals indicative thereof.

* * * * *